US011353334B2

(12) United States Patent
Szilágyi et al.

(10) Patent No.: US 11,353,334 B2
(45) Date of Patent: Jun. 7, 2022

(54) METHOD AND APPARATUS FOR MULTI-VEHICLE MANEUVER AND IMPACT ANALYSIS

(71) Applicant: NOKIA TECHNOLOGIES OY, Espoo (FI)

(72) Inventors: Péter Szilágyi, Budapest (HU); Csaba Vulkán, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/260,079

(22) PCT Filed: Sep. 11, 2018

(86) PCT No.: PCT/EP2018/074397
§ 371 (c)(1),
(2) Date: Jan. 13, 2021

(87) PCT Pub. No.: WO2020/052733
PCT Pub. Date: Mar. 19, 2020

(65) Prior Publication Data
US 2021/0247205 A1 Aug. 12, 2021

(51) Int. Cl.
G01C 21/00 (2006.01)
G08G 1/0968 (2006.01)
(Continued)

(52) U.S. Cl.
CPC ..... *G01C 21/3878* (2020.08); *G01C 21/3807* (2020.08); *G01C 21/3841* (2020.08); *G01C 21/3856* (2020.08); *G01C 21/3889* (2020.08)

(58) Field of Classification Search
CPC .. G08G 1/096708; G08G 1/16; G08G 1/0968; G05D 1/0265; G05D 1/0088;
(Continued)

(56) References Cited

U.S. PATENT DOCUMENTS

2006/0126556 A1* 6/2006 Jiang ................ H04W 4/06
370/328
2009/0247186 A1* 10/2009 Ji ..................... G01S 5/12
455/456.1
(Continued)

FOREIGN PATENT DOCUMENTS

CN 104521299 A 4/2015

OTHER PUBLICATIONS

International Search Report and Written Opinion dated Dec. 13, 2018 corresponding to International Patent Application No. PCT/EP2018/074397.
(Continued)

*Primary Examiner* — Yuri Kan
(74) *Attorney, Agent, or Firm* — Squire Patton Boggs (US) LLP

(57) ABSTRACT

There are disclosed various methods and apparatuses for multi-vehicle maneuver and impact analyses. According to an embodiment, the apparatus comprises at least one processor and at least one memory including computer program code, the at least one memory and the computer program code configured to, with the at least one processor, cause the apparatus at least to: receive sensor data from at least one motion sensor associated with a selected vehicle from a plurality of vehicles, said sensor data indicating movements of the vehicle in a geographical area; obtain from the sensor data location of the vehicle in the geographical area; maintain a vehicle location and motion database having at least three grid layers of grid cells representing at least a part of the geographical area, said grid cells of the at least three grid layers being partly overlapping so that borders of the grid cells of different grid layers have an offset between each other; map the location of the vehicle to a grid cell of each grid layer into which the location of the vehicle belongs; insert or maintaining an identifier of the vehicle in a list of (Continued)

vehicle identifiers for the mapped grid cell of each grid layer; and determine on the basis of the identifiers of the vehicles in the lists which other vehicles are in a proximity of said selected vehicle.

21 Claims, 19 Drawing Sheets

(51) Int. Cl.
H04W 4/22 (2009.01)
H04W 4/02 (2018.01)
H04J 1/00 (2006.01)

(58) Field of Classification Search
CPC . H04W 4/021; H04W 36/00837; H04W 4/06; H04W 4/22; H04W 4/02; G06F 3/04886; G01C 21/32; G01C 21/00; G01C 21/3878; G01S 5/12; H04J 1/00
See application file for complete search history.

(56) References Cited

U.S. PATENT DOCUMENTS

| | | | |
|---|---|---|---|
| 2010/0042315 A1* | 2/2010 | Ikeuchi | G01C 21/32 701/532 |
| 2012/0306929 A1* | 12/2012 | Chalkov | G06F 3/04886 345/666 |
| 2016/0116916 A1* | 4/2016 | Pink | G08G 1/16 701/23 |
| 2016/0282868 A1* | 9/2016 | Yamamura | G05D 1/0088 |
| 2016/0353238 A1* | 12/2016 | Gherardi | H04W 4/021 |
| 2017/0098373 A1* | 4/2017 | Filley | G08G 1/096708 |
| 2017/0285630 A1* | 10/2017 | Yamamura | G05D 1/0265 |
| 2021/0091848 A1* | 3/2021 | Cai | H04W 36/00837 |

OTHER PUBLICATIONS

International Preliminary Report on Patentability dated Aug. 26, 2020 corresponding to International Patent Application No. PCT/EP2018/074397.

Chinese Office Action corresponding to CN Application No. 201880097400.5, dated Sep. 22, 2021.

European Communication pursuant to Article 94(3) EPC, corresponding to EP Application No. 18 769 976.4, dated Apr. 5, 2022.

Chinese Office Action corresponding to CN Application No. 201880097400.5, dated Mar. 7, 2022.

* cited by examiner

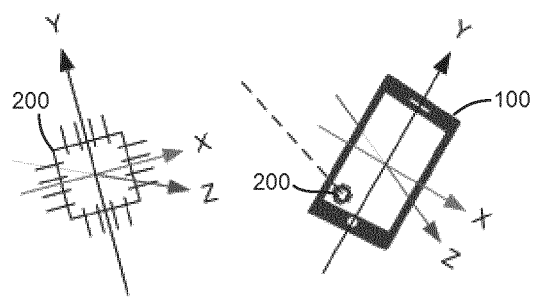
Fig. 1a　　Fig. 1b
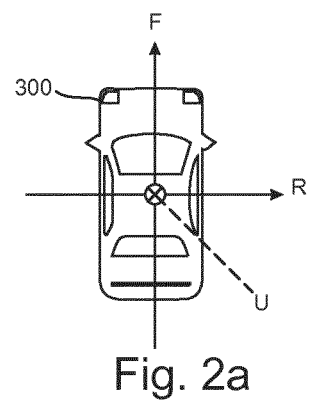　　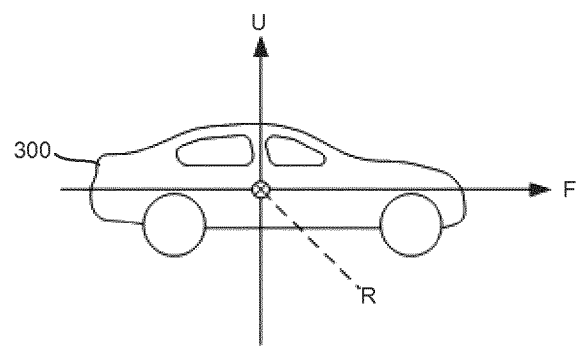
Fig. 2a　　　　　　　　Fig. 2b

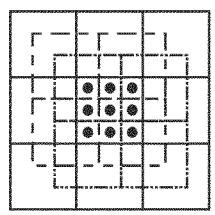
Fig. 9a
 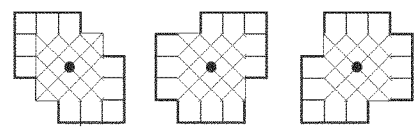
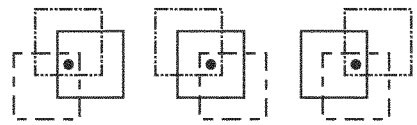 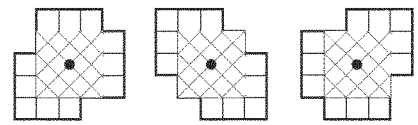
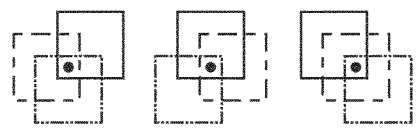 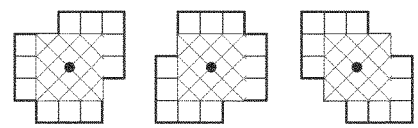
Fig. 9b  Fig. 9c

METHOD AND APPARATUS FOR MULTI-VEHICLE MANEUVER AND IMPACT ANALYSIS

TECHNICAL FIELD

The present invention relates to a method for multi-vehicle maneuver and impact analyses, an apparatus for multi-vehicle maneuver and impact analyses and a computer code for multi-vehicle maneuver and impact analyses as well as a user equipment for multi-vehicle maneuver and impact analyses.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Driver behaviour analytics based on monitoring the motion and maneuvers of manned vehicles may contribute to increased road safety and can provide valuable insight for road infrastructure utilization and optimization. Vehicles may cover a wide range of machines including passenger cars, taxies, trucks, buses, bicycles, motorbikes, and/or even boats, vessels, etc. During a trip, each driver is influenced by many aspects, e.g., the road infrastructure and topology along the selected route, the capabilities of the vehicle, the skills and style of the driver, as well as the presence and motion of other vehicles. In particular, detecting and understanding the interaction among multiple vehicles/drivers may be important as hazardous driving behaviour may create dangerous traffic situations where even cautious participants are pressurized by the careless behaviour of other drivers. Recognizing such near-incident situations automatically and taking appropriate actions may increase road safety considerably.

Motion sensors are nowadays commonly available in small form factor using micro-electrical-mechanical system (MEMS) technology, which enables their integration into many electrical products and devices such as smartphones, wearable devices or even directly to vehicles. Usually the platform or operating system running on such devices provides access to the sensor data via an application programming interface (API) that provides the accelerometer and gyroscope data in 3D vector format with components corresponding to the acceleration or rotation along/around the X, Y and Z axes. These axes define the sensor's 3D coordinate system, meaning that any motion sensor data is to be interpreted relative to the physical orientation of the sensor (or its enclosing device) itself.

Manual analysis of accident scenarios is carried out commonly to identify which driver was the victim or the faulty one, however it usually requires tedious reconstruction of the scene based on witnesses, camera recordings or the elaboration of the drivers themselves. In the absence of hard evidence and debatable or ambiguous reports, it is challenging to establish a clear understanding of what has happened. The lack of autonomous systems that are able to identify suspicious dangerous situations makes the majority of near-incident events go undetected.

SUMMARY

Various embodiments provide a method, apparatus and computer code for multi-vehicle maneuver and impact analyses, an apparatus for multi-vehicle maneuver and impact analyses and a computer code for multi-vehicle maneuver and impact analyses as well as a user equipment for multi-vehicle maneuver and impact analyses.

Various aspects of examples of the invention are provided in the detailed description.

According to a first aspect, there is provided an apparatus comprising at least one processor and at least one memory including computer program code, the at least one memory and the computer program code configured to, with the at least one processor, cause the apparatus at least to:

receive sensor data from at least one motion sensor associated with a selected vehicle from a plurality of vehicles, said sensor data indicating movements of the vehicle in a geographical area;

obtain from the sensor data location of the vehicle in the geographical area;

maintain a vehicle location and motion database having at least three grid layers of grid cells representing at least a part of the geographical area, said grid cells of the at least three grid layers being partly overlapping so that borders of the grid cells of different grid layers have an offset between each other;

map the location of the vehicle to a grid cell of each grid layer into which the location of the vehicle belongs;

insert or maintain an identifier of the vehicle in a list of vehicle identifiers for the mapped grid cell of each grid layer; and determine on the basis of the identifiers of the vehicles in the lists which other vehicles are in a proximity of said selected vehicle.

According to a second aspect, there is provided a method comprising:

receiving sensor data from at least one motion sensor associated with a selected vehicle from a plurality of vehicles, said sensor data indicating movements of the vehicle in a geographical area;

obtaining from the sensor data location of the vehicle in the geographical area;

maintaining a vehicle location and motion database having at least three grid layers of grid cells representing at least a part of the geographical area, said grid cells of the at least three grid layers being partly overlapping so that borders of the grid cells of different grid layers have an offset between each other;

mapping the location of the vehicle to a grid cell of each grid layer into which the location of the vehicle belongs;

inserting or maintaining an identifier of the vehicle in a list of vehicle identifiers for the mapped grid cell of each grid layer; and determining on the basis of the identifiers of the vehicles in the lists which other vehicles are in a proximity of said selected vehicle.

According to a third aspect, there is provided a computer program product including one or more sequences of one or more instructions which, when executed by one or more processors, cause an apparatus to at least:

receive sensor data from at least one motion sensor associated with a selected vehicle from a plurality of vehicles, said sensor data indicating movements of the vehicle in a geographical area;

obtain from the sensor data location of the vehicle in the geographical area;

maintain a vehicle location and motion database having at least three grid layers of grid cells representing at least a part of the geographical area, said grid cells of the at least three grid layers being partly overlapping so that borders of the grid cells of different grid layers have an offset between each other;

map the location of the vehicle to a grid cell of each grid layer into which the location of the vehicle belongs;

insert or maintaining an identifier of the vehicle in a list of vehicle identifiers for the mapped grid cell of each grid layer; and determine on the basis of the identifiers of the vehicles in the lists which other vehicles are in a proximity of said selected vehicle.

According to a fourth aspect, there is provided a user equipment comprising at least one processor and at least one memory including computer program code, the at least one memory and the computer program code configured to, with the at least one processor, cause the apparatus at least to:

exchange information with a vehicle location and motion database and a grid location database, said grid location database having at least three grid layers of grid cells representing at least a part of the geographical area and a list of vehicle identifiers for each of said at least three grid layers, said grid cells of the at least three grid layers being partly overlapping so that borders of grid cells of different grid layers have an offset between each other, and said vehicle location and motion database having information of movements of vehicles located in the geographical area;

receive a vehicle identifier of a selected vehicle;

search from the grid location database at least a grid cell from each of the at least three grid layers with which the vehicle identifier of the selected vehicle has been associated;

obtain from the list of vehicle identifiers an identifier of at least one other vehicle associated with any of the searched grid cell; and determine on the basis of the identifiers of vehicles in the lists which other vehicles are in a proximity of said selected vehicle.

BRIEF DESCRIPTION OF THE DRAWINGS

For a more complete understanding of example embodiments of the present invention, reference is now made to the following descriptions taken in connection with the accompanying drawings in which:

FIG. 1a shows an example of a motion sensor and a three-dimensional coordinate system of the motion sensor;

FIG. 1b shows an example of a device comprising the motion sensor and a three-dimensional coordinate system of the device;

FIGS. 2a and 2b show an example of a coordinate system of a vehicle;

FIG. 9a illustrates an example of possible locations and their relation to grid cells on three different grid layers, in accordance with an embodiment;

FIG. 9b illustrates for each possible location of FIG. 9a which grid cell of each of the three layers contain that particular location, in accordance with an embodiment;

FIG. 9c illustrates in each potential area shape, an interest area which stretches over the example location by at least d/3 on every direction, in accordance with an embodiment;

DETAILED DESCRIPTION OF SOME EXAMPLE EMBODIMENTS

Figure 3:
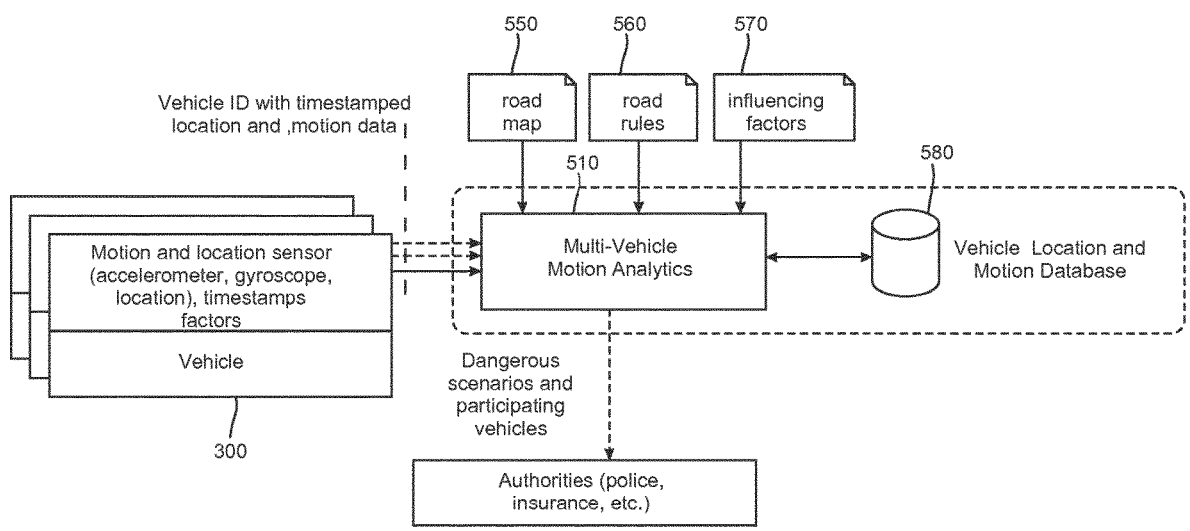
FIG. 3 illustrates an example of a high-level architecture of a system.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Accelerometers provide a three-dimensional vector reporting the acceleration [m/s2] measured along three orthogonal sensor axes (commonly denoted as X, Y, Z). Gyroscopes report the rotational speed components [rad/s] around the same sensor axes. Linear accelerometer is a variant of an accelerometer that excludes the force of gravity from its reported measurements. The sensor axes define a three-dimensional (3D) coordinate system relative to the sensor's physical orientation. Sensors may be installed in multi-purpose devices such as smartphones, in which case the sensor's coordinate system is aligned to the orientation of the enclosing device. An example of a 3D coordinate system of a sensor 200 is shown in FIG. 1a. FIG. 1b illustrates an example of a 3D coordinate system of an apparatus 100 comprising the sensor 200 of FIG. 1a.

In the following, accelerometers 202 and gyroscopes 204 are also called as motion sensors and a device which comprises at least one accelerometer and at least one gyroscope is also called as a motion sensor apparatus or a sensor apparatus 200.

Motion sensors mounted inside a vehicle can provide valuable information about the movements and maneuvers of the vehicle, such as acceleration/brake, steering (left/right turn), lane changes, overtaking, etc. In order to intuitively understand movements of the vehicle, it may be described relative to a reference frame of the vehicle. For example, when a vehicle increases its speed through its engine, it is intuitively described as an acceleration vector pointing towards to front of the vehicle, regardless of the orientation of the vehicle in the world's coordinate system, to the magnetic North or to any other absolute reference system. Therefore, to describe and analyze motion of the vehicle and what it means from the driver's perspective, a coordinate system of the vehicle may be introduced, as shown in FIGS. 2a and 2b in accordance with an embodiment. The coordinate system of the vehicle is defined by three orthogonal axes, for example by creating a right-handed coordinate system in which the rightward R, forward F and upward U directions are defined relative to the physical frame of the vehicle. FIG. 2a is a top view showing a forward F and a rightward R coordinate direction of the vehicle 300. The upward U coordinate direction points towards the viewer. FIG. 2b is a side view showing the forward F and upward U coordinate direction of the vehicle 300. The rightward R coordinate direction points towards the viewer.

Measuring the vehicle's movements may require a motion sensor that is installed in the vehicle or brought onboard inside a device such as a smartphone. However, such motion sensor reports acceleration and rotation in the sensor's or device's own coordinate system, e.g. based on the X, Y and Z axes as shown in FIGS. 1a and 1b, that may not generally be aligned with the vehicle's rightward R, forward F and upward U coordinate system as shown in FIGS. 2a and 2b (i.e., axes in the two coordinate systems may not be pairwise parallel). Consequently, a forward acceleration a in the vehicle's coordinate system may have an arbitrary representation in the sensor's coordinate system.

In the following it is assumed that the apparatus 100 is aware of the relationship between the orientation of the sensor's and the vehicle's coordinate system. Therefore, the apparatus 100 can inform maneuvers of the vehicle 300 in view of the vehicle's coordinate system. The sensor data may be interpreted by the apparatus 100 and converted to maneuver information, which may then be transmitted to a server or another entity which may perform further analyses on the basis of the maneuver information. In accordance with another embodiment, the apparatus 100 transmits from the vehicle 300 sensor data, wherein the sensor data is converted to maneuver information in the server.

In the following, an example implementation of an apparatus 100 for vehicles 300 is described in more detail. It is assumed that the vehicle 300 has a motion sensor 200 located on-board. The motion sensor 200 may be embedded in or part of the vehicle's electrical and information system; it may be in a sensor placed in the vehicle during post-market installation; it may be a sensor that is inside a device 100 brought on-board the vehicle 300 but which is not part of the vehicle, such as a smartphone having motion sensors 200, or a purpose-build device with motion sensors 200 and communication interfaces to access the motion sensor data.

In accordance with an embodiment the apparatus 100 only performs the initial processing of sensor data and communicates the sensor data to the network 700, wherein the multi-vehicle motion analyzer 510 has a maneuver analytics element (not shown) to analyze the received data and determine trajectory, maneuvers and possibly other motion and location based analytics for the vehicle 300. In accordance with another embodiment, the analyzing is performed by the apparatus 100 in the vehicle and the apparatus 100 transmits the results of the analytics to the multi-vehicle motion analyzer 510. In accordance with an embodiment, the motion sensors 201, 202 may also be attached with a register plate 302 of a vehicle 300. For example, the motion sensor 201, 201 may be integrated in a hollow space in the register plate 302, on a surface of a backside of the register plate 302, etc. In addition to the motion sensors 201, 202, also the communication element 103 of the apparatus, or all the whole apparatus 100 may be attached with the register plate 302 of the vehicle 300. There may also be a power source such as a battery for supplying power to the elements of the apparatus which are attached with the register plate. These elements may have such a low power consumption that the battery may have enough capacity to supply power for several years. In accordance with an embodiment, the electric energy for the elements may be provided by some device which is able to generate electricity from illumination by, for example, a solar panel, from movements such as vibrations by, for example, a piezo-electric device, etc.

The high-level architecture of a system 500 is shown in FIG. 3, in accordance with an embodiment. Vehicles 300 transmit motion and location data to a multi-vehicle motion analyzer 510 via a wireless communication connection, such as a mobile communication network. The multi-vehicle motion analyzer 510 receives the motion and location data from a plurality of vehicles. The multi-vehicle motion analyzer 510 also have access to a road map database 550, a road rules database 560 and an influencing factors database 570. The road map database 550, road rules database 560 and influencing factors database 570 can be implemented in a mass memory of the system 500 so that the multi-vehicle motion analyzer 510 can send a query to any of these databases and receives a response to the query. In accordance with an embodiment, the multi-vehicle motion analyzer 510 and the databases are implemented in a same computing device, such as a server in a communication network. In accordance with another embodiment, the multi-vehicle motion analyzer 510 is implemented in one computing device and the databases are implemented in another device. The system also comprises a vehicle location and motion database 580 into which the multi-vehicle motion analyzer 510 can store motion and location data received from the vehicles and also retrieve such data from the vehicle location and motion database 580. Also the vehicle location and motion database 580 can be implemented in the same computing device than the multi-vehicle motion analyzer 510 or in another device.

Figure 4:
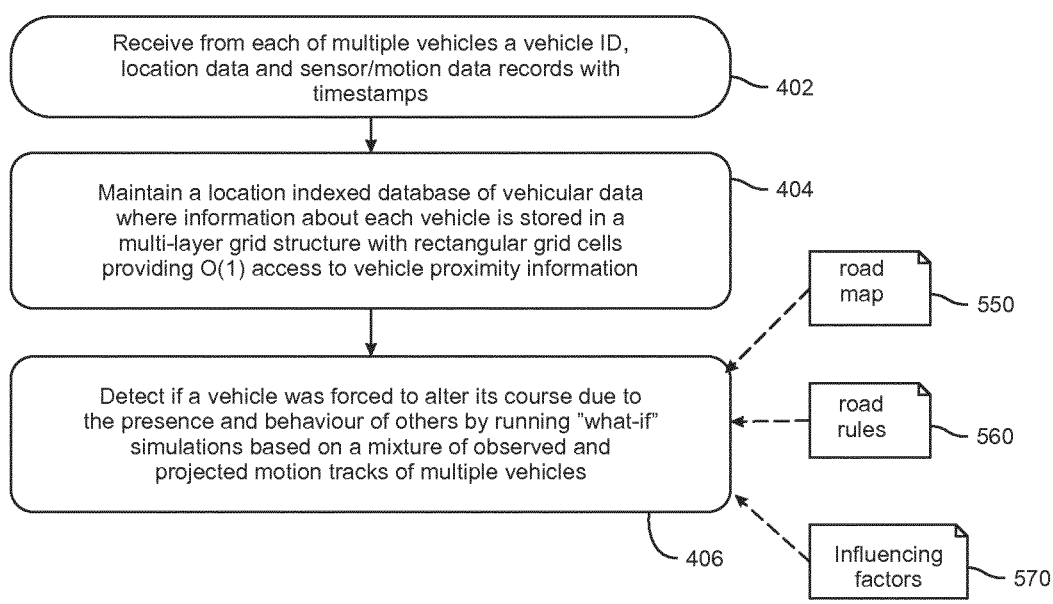
FIG. 4 illustrates an example of operation of a multi-vehicle motion analyzer.

The operation of the multi-vehicle motion analyzer 510 is outlined in FIG. 4 in a simplified manner.

The multi-vehicle motion analyzer 510 receives 402 from a plurality of vehicles 300 vehicle identification data (vehicle ID), motion data, location data, time data related to the moment of capturing the motion data and the location data. The multi-vehicle motion analyzer 510 stores 404 the received data to the vehicle location and motion database 580. The information about the vehicles 300 is stored in a multi-layer grid structure with grid cells providing O(1) (Big O 1) access to vehicle proximity information. In accordance with an embodiment, this can be performed as follows. The multi-vehicle motion analyzer 510 uses the location data of a vehicle to determine which grid cell in each grid layer contains that particular location. When the grid cells have been determined, the multi-vehicle motion analyzer 510 add a vehicle identifier to a list of vehicles of those grid cells. Hence, list of vehicles of a grid cell indicates which vehicles are at a particular moment within the area covered by the grid cell.

More details of the grid structure will be explained later in this specification.

The identifier of a vehicle is in this context a unique symbol (e.g., a number, a letter, a name, a code, a plate number, etc.) or an aspect (e.g. color, etc.) that uniquely identifies a given vehicle. Regardless of its representation, identifiers are different for any two vehicles. However, similar register plate numbers/codes may exist in different countries, wherein the identifier may include an indication of the country, if the system is used in a geographical area covering more than one country, for example. It may also happen that a vehicle may travel from one country to another country where similar register plate already exists. In such cases a country code of the origin country of the vehicle may be added to the vehicle identifier.

The multi-vehicle motion analyzer 510 can use the motion and location data to detect 406 if a vehicle 300 was forced to alter its course due to a presence and behavior of one or more other vehicles by running "what-if" simulations based on a mixture of observed and projected motion tracks of multiple vehicles. The multi-vehicle motion analyzer 510 can retrieve information of a roads of the location where the vehicle 300 was forced to alter its course from the road map database 550. The multi-vehicle motion analyzer 510 can further retrieve information of possible road rules of the location where the vehicle 300 from the road rules database 560. There may also be some other factors which need to be taken into account, wherein the multi-vehicle motion analyzer 510 can retrieve such data from the influencing factors database 570.

Maneuvers performed by an individual vehicle 300 may be recognized by, for example, analysing motion sensor data obtained from a sensor device 200 attached with the vehicle (a.k.a. an on-board sensor). Understanding the reason of the maneuvers and their impact on other vehicles/drivers, however, is not possible by only considering one vehicle's data in isolation. A maneuver may be initiated routinely to follow a designated route and comply with road rules and regulations, or to specifically react to the presence and dynamic actions of other vehicles, among other things. Analysing the cause of a maneuver may require that a vehicle's motion sensor data and the recognized maneuvers are dynamically correlated with the sensor (location, motion) data and maneuvers of other vehicles; and additional static or semi-static contextual information such as road and environmental maps, rules and regulations, local weather, road quality and visibility conditions, etc.

Analyzing the motion pattern of multiple vehicles in the context of each other is only scalable if the analytics is limited to spatially and temporally relevant vehicles. Therefore, to perform multi-vehicle analytics vehicular data is stored in a database structure that supports certain data access patterns efficiently. This database is illustrated as the vehicle location and motion database 580 in FIG. 3. Such access patterns are to query the data associated with an individual vehicle (using the vehicle's identity as a query key) and to query the list of vehicles that are in the proximity of a given vehicle. Usually accessing a single vehicle's data is not a problem (a hash table indexed with the vehicle's identity achieves O(1) (Big O notation) amortized constant complexity). However, efficiently implementing the query to list vehicles in the proximity of a given location (other vehicle) in a general way is non-trivial. The database should keep track of continuous and dynamic changes in the location of individual vehicles as well as the proximity (pairwise distance) between pairs of vehicles. Keeping track of the ever-changing vehicle proximity may be computationally very intensive if an intuitive but brute force approach is followed (e.g., continuously re-calculating the distance of each pair of vehicles to check which vehicles are close to each other). Computing the list of vehicles that are in the proximity of a given location is a similarly complex task as in principle it requires to iterate through a list of candidate vehicles and calculate each of their distance from the given location. Such computations do not scale well with the number of vehicles that are involved: the required effort is proportional to the square of the number of vehicles, i.e., the complexity is $O(n^2)$ if n is the number of vehicles. A desirable method for keeping track of vehicle location and vehicle proximity would be O(n) in complexity, i.e., to scale linearly with the number of vehicles. Individual operations such as querying the list of vehicles in the proximity of a given location should be O(1) complexity. In other words, the time required for the query operation is constant and does not depend on the number of nearby vehicles. Such low complexity is not achieved by intuitive or brute force methods.

Finding the reason behind a vehicle's observed maneuvers requires to understand the vehicle's full context as there may be multiple reasons behind the observed behavior. Especially interesting is to capture the impact of the presence and behavior of vehicles on another vehicle as it enables to understand if a driver was pressurized or forced by others into performing a maneuver it otherwise would not have done. This is usually what happens when the careless or aggressive driver jeopardizes the road safety of others, and escalation to a more serious situation or even to an accident is only prevented by the precaution and evasive maneuvers of other road participants. A challenge in detecting such events is that a driving behavior that risks others may not violate any of the road rules literally, therefore it is hard to accurately describe and catch such behavior (as opposed to, e.g., speed limit violations). If no actual accident happens that involves official investigation, which is the case in almost all near-incident situations, aggressive road behavior remains unrecorded and the opportunity to regulate risky drivers at an early phase (before causing or triggering accidents) is missed. The detection of such danger situations should be supported by an automated apparatus (instead of relying solely on human police presence on the roads) to reach sufficient efficiency and coverage. Still, automating risk evaluation often needs to reason about "what-if" scenarios that did not actually happen but could have (or would have) happened if the drivers behaved or maneuvered differently (e.g., with less care).

In accordance with an embodiment, timestamped location and motion sensor data collected from multiple vehicles and additional road map and road rules context data can be used to identify situations where the dangerous behaviour of drivers could potentially cause or provoke accidents, put other drivers under uncomfortable pressure or force them to take evasive actions/maneuvers to prevent accidents or escape from the pressure. Other influencing factors such as weather and visibility may also be considered by the method to put the observed driver behaviour in context and correctly interpret road rules that are valid only in certain conditions. A method according to an example embodiment automatically identifies risky scenarios along with the identity of vehicles exercising dangerous behaviour; conserves and presents the observed facts; and provides verifiable reasons for its decision so that a human supervisor can understand why the situation was considered dangerous and how the aggressor vehicle was identified. The method is executed by an apparatus that is connected to the vehicles via a network so that motion sensor data is transmitted from multiple vehicles 300 to the multi-vehicle motion analyzer 510.

Figure 5:
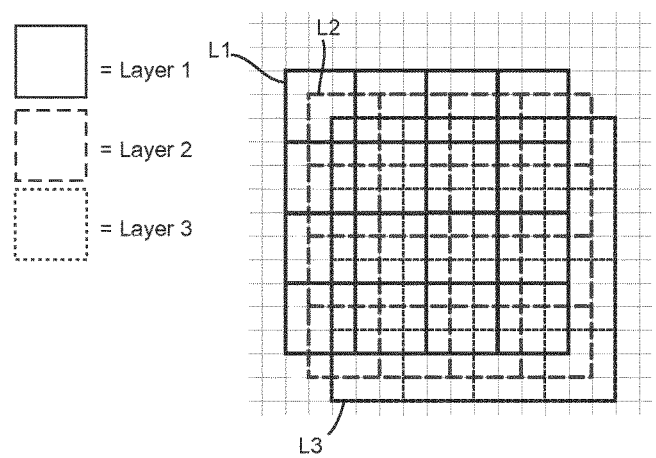
FIG. 5 shows an example of the multi-layer grid structure, in accordance with an embodiment.

The vehicle location and motion database 580 is a storage for location and motion data collected from multiple vehicles 300. The vehicle's data is indexed by (i.e., associated with) location areas (e.g. rectangular grid cells) that are overlapping in a specific way to provide a redundant and continuous partitioning of space. The efficiency of accessing vehicular data directly by location is encoded into the structure of the database, providing O(1) complexity queries for vehicles based on a location. The overlapping and offsetting of the cells on multiple layers guarantee that any given location's proximity is fully contained within the grid cells that contain the location itself; if the location were close to the edge of the grid cell on one layer, it would be close to the center of another grid cell on a different layer. Three grid layers are sufficient to contain the d/3 proximity of any point where d denotes that length of the grid cell edge. The database avoids searching for or iterating through vehicles at all and need not calculate distances between vehicles, avoiding costly computations altogether. The vehicle location and motion database 580 is an enabler for efficiently accessing data of multiple relevant vehicles that need to be analysed together. An example of the multi-layer grid structure is illustrated in FIG. 5. Grid cells marked with solid lines represent grid cells of a first layer L1, grid cells marked with dashed lines represent grid cells of a second layer L2, and grid cells marked with dotted-dashed lines represent grid cells of a third layer L3.

Using at least three grid layers has the advantage that there are no such locations in the geographic area in which edges or corners of all grid layers coincide. In other words, there is at least one grid cell which does not have an edge or a corner at a point where one or more of the other layers has such an edge or corner. If only two grid layers were used, a plurality of locations existed where grid cells of each layer have either an edge or a corner. If a vehicle were located at such location, it would not be possible to select only one grid cell at any of the two layers within which the vehicle would be located but at least two grid cells should be selected at one layer. Hence, that kind of selection could lead to a situation in which vehicles outside of a region of interest would be examined.

However, it should be noted that in accordance with an embodiment it may also be possible to have more than three grid layers.

In accordance with an embodiment, the grid cell size i.e. the width and/or the length can be different in different geographical locations. For example, grid cell size may be larger in highway areas and rural areas and smaller in urban areas or areas where there are more roads (higher road density in the region).

Figure 6:
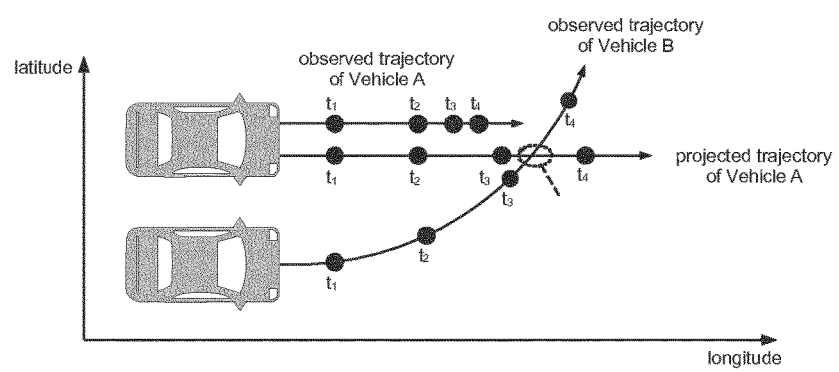
FIG. 6 presents an example scenario of a "what-if" simulation, in accordance with an embodiment.

The multi-vehicle motion analyzer 510 identifies if a vehicle was forced by other vehicles to change its course or execute a maneuver. In accordance with an embodiment, the method comprises a deterministic technique to evaluate whether an observed behavior/maneuver of a driver (potential victim) was likely to be the direct outcome of one or more other vehicles acting non-cooperatively or rightward aggressively. One idea the method utilizes is to identify the artificial part in the suspected victim's maneuvers that is likely to be induced only by the presence of others and to evaluate what would have happened if the victim was not executing that artificial part. The evaluation consists of replaying the observed (ground truth) motion data of those vehicles that are suspected to have pressured the victim, along with a projected (synthetized) motion data of the victim that excludes the suspected artificial part of the victim's motion. The suspected victim's synthetized motion track (i.e., its likely path without the impact of others) may reveal that the resulting scenario would have been dangerous (e.g., vehicles approaching below a safe distance, or the risk of accident is otherwise increased), and it was the suspected victim's extra maneuver that prevented the situation from escalating in the reality. Such scenarios are marked as dangerous ones, the ground truth and projected motion tracks are saved and the identities of the aggressive vehicles are recorded to enable further examination by authorities. The analytics process mixing observed and projected motion tracks is referred to as "what-if" simulations later on. FIG. 6 presents an example scenario and "what-if" simulation showing that "Vehicle A" had the right of way but it was cut short by "Vehicle B" so that "Vehicle A" had to slow down (forced maneuver) to avoid the formation of a danger area (close proximity or even potential crash with "Vehicle B").

As was mentioned above, vehicles 300 are equipped with the motion sensor and location sensor (such as GPS, Global Positioning System) and they have access to accurate enough time information. The time information may be obtained from the GPS system which provides a globally synchronized time source. The motion/location sensor may be embedded in or part of the vehicle's electrical and information system; it may be in a sensor placed in the vehicle during post-market installation; it may be a sensor that is inside a device brought on-board the vehicle but which is not part of the vehicle, such as a smartphone having motion sensors, or a purpose-build device with motion sensors and communication interfaces to access the motion sensor data.

Figure 7:
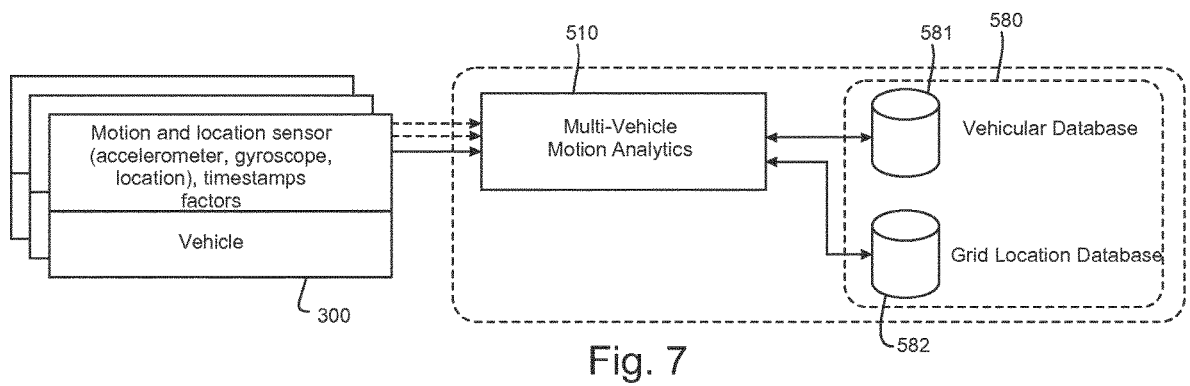
FIG. 7 illustrates an example of a system, in accordance with an embodiment.

A suitable deployment of the multi-vehicle motion analyzer 510, which analyses the motion pattern of multiple vehicles, is to run them on one or more computer servers that are connected to the vehicle data sources via one or more networks (FIG. 7). The interface between the motion/location sensors and the multi-vehicle motion analyzer 510 may be an application programming interface (API), such as the Android Sensor API, if the platform hosting the motion sensors is running Android operating system. It should be noted that any other hardware and software stack or other APIs are equally usable, and that the sensor data may already be pre-processed between the motion/location sensors and the multi-vehicle motion analyzer 510 by additional entities. One example is an entity that transforms the motion sensor data from the sensor coordinate system to a vehicle's coordinate system. In FIG. 7 the interface between the motion/location sensors and the multi-vehicle motion analyzer 510 comprises a network connection such as an application layer or data representation protocol (e.g., JSON, ProtoBuf, REST, etc.), a transport and network layer protocol (e.g., TCP/IP, or TLS/TCP/IP for encrypted connections) and a wired or wireless physical layer protocol (e.g., CAN bus, Ethernet, Bluetooth, Wi-Fi, LTE, LTE-A, NB-IoT, LTE-M, 5G, etc.).

Figure 8:
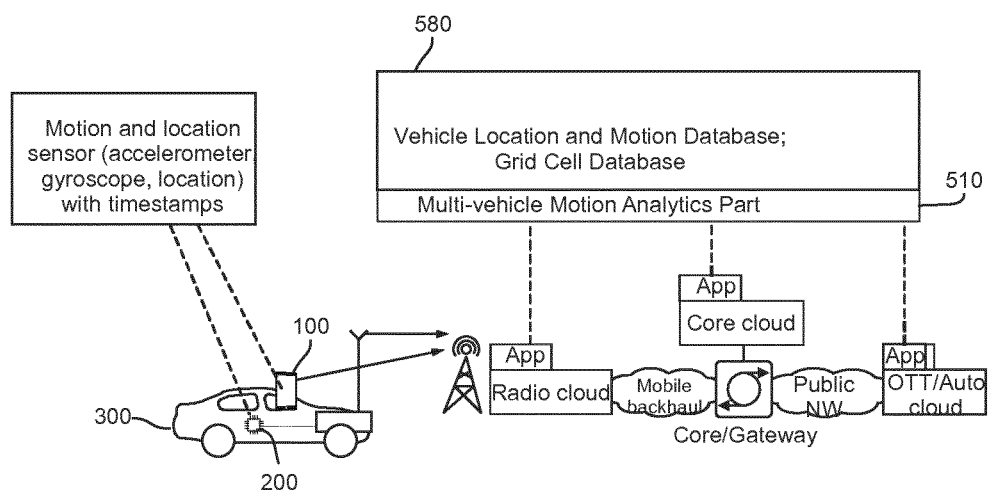
FIG. 8 illustrates one example of a deployment option in mobile networks, in accordance with an embodiment.

One specific deployment option in mobile networks is shown in FIG. 8. The motion/location sensors may be located in a vehicle 300 as discussed previously; the multi-vehicle motion analyzer 510 and the vehicle location and motion database 580 may be running as software implementations (including the possibility of Virtual Network Functions, VNFs) on one or more edge clouds (such as Multi-access Edge Computing, MEC), core clouds, or clouds accessible over the Internet.

In the following, some details of the vehicle location and motion database 580 and the multi-vehicle motion analyzer 510 are described in more detail.

The role of the vehicle location and motion database 580 is to store the motion and location data collected from multiple vehicles 300 in a way that is efficient to maintain and to run location based queries on. The physical space (e.g., longitude-latitude map coordinate system) is partitioned into adjacent rectangular grid cells. Cells are generated on a plurality of layers. In accordance with an embodiment, three layers are used, where the layers are offset by one third of the rectangle grid cell edge length. In the resulting multi-layer grid structure, the proximity of each point (location) is defined as the area covered by the superposition of the one or more grid cells that fully contain the given point. The structure guarantees that even during a continuous motion in the map coordinate system, an object (e.g., a vehicle 300) will always be contained by at least one grid cell and thus its proximity will stretch over the point by at least one third of the grid cell rectangle length (but usually by more than that). The concept of this proximity is illustrated in FIGS. 9a, 9b and 9c.

Generally, when there are N layers (N>=3), the offset can be set so that it is 1/N of the length of the edge of the grid cell. However, the offset need not be the same for each grid layer but differences between offsets of different layers may exist. As an example, if there are four layers (layer 1, layer 2, layer 3, layer 4), the offsets could be as follows: the offset between layer 1 and layer 2 is 0.25 of the length of the edge, the offset between layer 2 and layer 3 is 0.5 of the length of the edge, and the offset between layer 2 and layer 3 is 0.25 of the length of the edge.

FIG. 9a illustrates an example of possible locations (depicted as black dots) and their relation to grid cells on three different grid layers 901, 902, 903.

FIG. 9b illustrates for each possible location which grid cell of each of the three layers contain that particular location. For example, the upper left part of FIG. 9b illustrates the grid cells which contain the location covered by the upper-left corner of the grid cell of the first layer 901. These grid cells form a kind of a potential area shape, defined by the borders of the grid cells of each layer containing a particular location.

FIG. 9c illustrates in each potential area shape, an interest area which stretches over the example location by at least d/3 on every direction (illustrated by the hatched rectangle).

Figure 10:
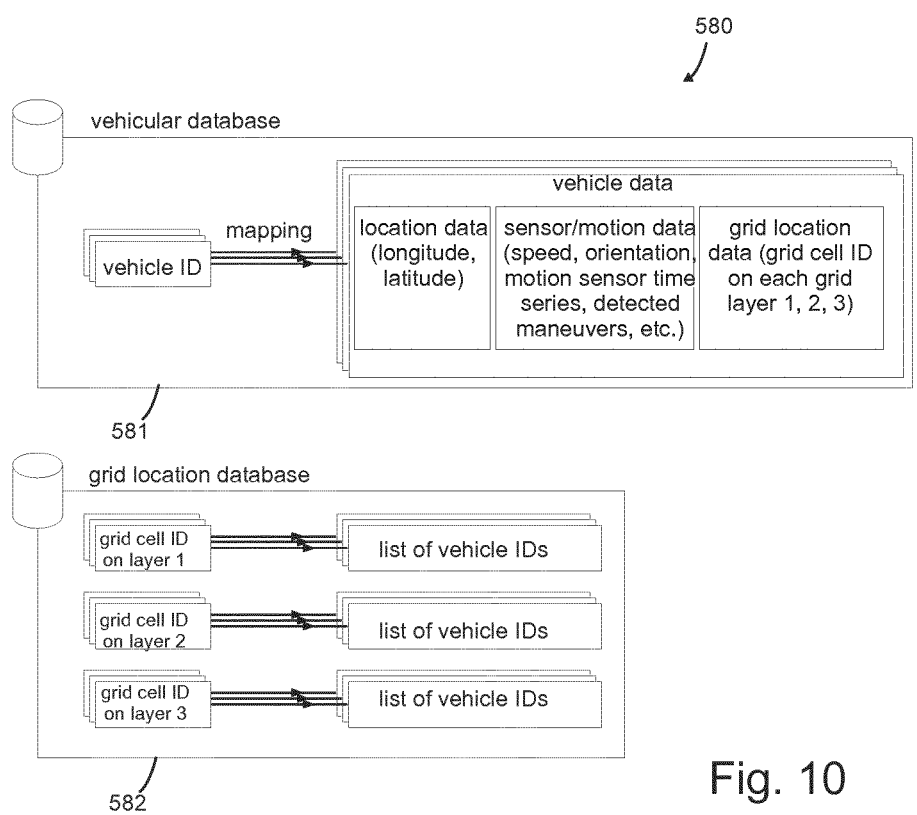
FIG. 10 shows an example of the storage architecture of the vehicle location and motion database, in accordance with an embodiment.

An example of the storage architecture of the vehicle location and motion database 580 is shown in FIG. 10. The content of the database is split into two parts: the vehicular database 581 and the grid location database 582. The vehicular database is indexed by the identity of vehicles and comprises information corresponding to the designated vehicle. The information stored per vehicle includes its current and one or more past locations (i.e., a trajectory of the vehicle), motion sensor data (current speed, heading, acceleration, rotation, etc. as well as a time series record of previous movements), recognized/interpreted maneuvers (such as lane change, turns, braking, etc.), and grid location data that is the identity of the three grid cells containing the vehicle's current position on each grid layer. The grid location database is indexed by the grid cell IDs on each grid layer and for each grid cell ID it contains the list of vehicles (by their ID) whose location is currently contained by the given grid cell.

Figure 11:
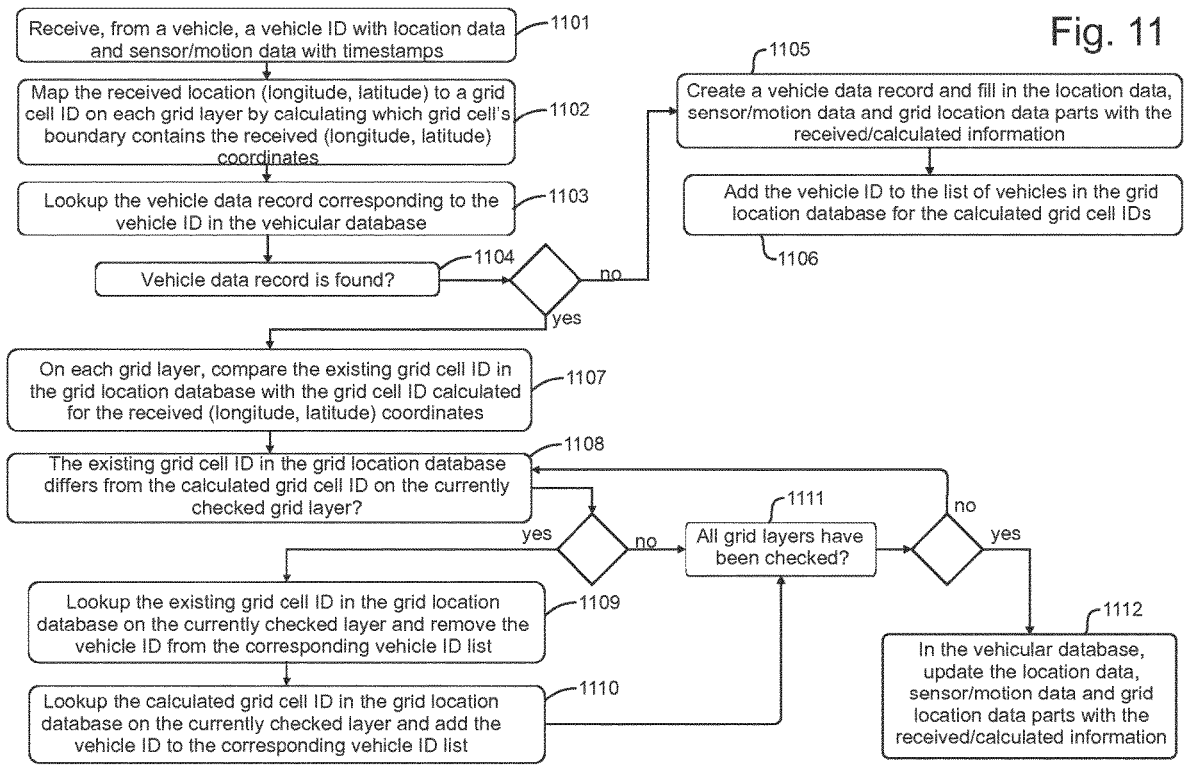
FIG. 11 shows an example process of updating the database, in accordance with an embodiment.

The vehicle location and motion database 580 is updated each time new motion/location information is received by the apparatus from any of the monitored vehicles. The process of updating the database (both the vehicular database part and the grid location part) is defined by FIG. 11.

In step 1101 a vehicle ID with location data and sensor/motion data with timestamps is received from a vehicle.

In step 1102 the received location (longitude, latitude) is mapped to a grid cell ID on each grid layer by calculating which grid cell's boundary contains the received (longitude, latitude) coordinates.

In step 1103 the vehicle data record corresponding to the vehicle ID is looked-up in the vehicular database.

In step 1104 it is examined whether vehicle data record is found.

If vehicle data record was not found, a vehicle data record is created in step 1105 and the location data, sensor/motion data and grid location data parts are filled in with the received/calculated information. Then, in step 1106 the vehicle ID is added to the list of vehicles in the grid location database for the calculated grid cell IDs.

If the examination in step 1104 revealed that vehicle data record was found, then in step 1107 the existing grid cell ID in the grid location database is compared on each layer with the grid cell ID calculated for the received (longitude, latitude) coordinates.

In step 1108 it is examined if the existing grid cell ID in the grid location database differs from the calculated grid cell ID on the currently checked grid layer. If so, the process continues from step 1109 in which the existing grid cell ID in the grid location database on the currently checked layer is looked-up and the vehicle ID is removed from the corresponding vehicle ID list. Then, in step 1110 the calculated grid cell ID in the grid location database on the currently checked layer is looked-up and the vehicle ID is added to the corresponding vehicle ID list, and the process continues from step 1111.

If it was determined in step 1108 that the existing grid cell ID in the grid location database does not differ from the calculated grid cell ID on the currently checked grid layer, the process continues from step 1111.

In step 1111 it is examined if all grid layers have been checked. If not, the process returns to step 1108. Otherwise, in step 1112 update the location data, sensor/motion data and grid location data parts are updated in the vehicular database with the received/calculated information.

Due to the process each vehicle's location (both in terms of longitude/latitude coordinates as well as on grid cell level) is kept up-to-date in the corresponding vehicular database record. Additionally, if the location on the grid cell level changes (on any grid layer), the grid location part is also updated by removing the vehicle from its old grid cell's list and adding the vehicle to the new grid cell's list. These updates do not require to perform complex search in the database; if the maps are implemented as a hash map, the lookup of a vehicle ID or grid cell ID is O(1) complexity, and any further action such as updating a field in the corresponding data record is also O(1). Additionally, mapping a longitude/latitude coordinate to a grid cell is a trivial O(1) operation (multiply the coordinate by the grid cell edge length).

In this context mapping of a location of a vehicle to a grid cell means an act of finding which grid cell, defined as a closed shape (e.g., a rectangle) on a two-dimensional (2D) plane (e.g., the Earth's surface, addressed by latitude/longitude coordinates), contains the location of the vehicle, defined as a coordinate on the same 2D plane (e.g., the Earth's surface, addressed as a single latitude/longitude coordinate). The grid cell may be defined as a list of vertices, each defined by its coordinate. The mapping may involve geometric comparison or more complex calculation performed on the coordinate of the vehicle location and the coordinates of the vertices of the grid cell.

As a vehicle moves along a trajectory and reports changes in its location, the vehicle location and motion database 580 is updated accordingly. The process is triggered by events when the vehicle crosses grid cell boundaries, as illustrated in FIG. 12 (showing only a single grid layer).

Figure 12:
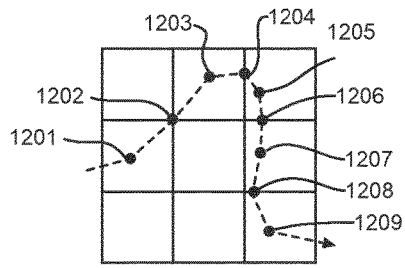
FIG. 12 shows an example of a trajectory of a vehicle through locations covered by different grid cells, in accordance with an embodiment.

In the example of FIG. 12 the grid cells are numbered from 1 to 9 in a horizontal scanning order from top to bottom, i.e. the top-left grid cell is grid cell #1, the grid cell to the right of the top-left grid cell is grid cell #2, . . . , and the bottom-right grid cell is grid cell #9. The first dot 1201 represents a location in the middle of the grid cell #4. When the vehicle crosses the border corner between the grid cell #4 and the grid cell #2, the vehicle is remapped to the grid cell #2 (dot 1202). The vehicle remains mapped to the grid cell #2 (dot 1203) until it crosses the border between the grid cell #2 and the grid cell #3. Similar operations are performed following the trajectory of the vehicle (dots 1204-1209).

Figure 13:
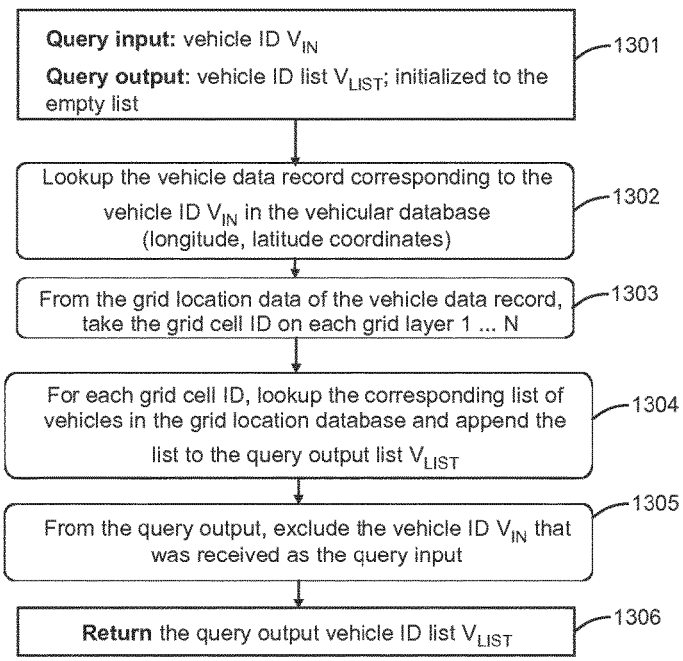
FIG. 13 shows a flow diagram of computing the response for a query, in accordance with an embodiment.

Due to the O(1) complexity of all database operations, keeping location bound data in the above multi-layer grid based database structure can be efficient for answering queries such as which are the vehicles that are in the proximity of a given vehicle. Computing the response for such query is detailed in FIG. 13.

Step 1301 illustrates that an input for the query i.e. Query input is an identifier of the vehicle: vehicle ID $V_{IN}$. For the query, a vehicle identifier list $V_{LIST}$ (vehicle ID list) is initialized to an empty list.

In step 1302 the vehicular database is looked up to find a vehicle data record which corresponds to the vehicle ID $V_{IN}$.

In step 1303 the grid cell ID on each grid layer 1 . . . N is taken from the grid location data of the vehicle data record.

In step 1304, for each grid cell ID, the corresponding list of vehicles is looked-up in the grid location database and the list is appended to the query output list $V_{LIST}$.

In step 1305 the vehicle ID $V_{IN}$ that was received as the query input is excluded from the query output. In accordance with an embodiment, plurality of occurrences of the same vehicle IDs will be removed from the output list $V_{LIST}$. In other words, the same vehicle ID exists only once in the output list $V_{LIST}$.

In step 1306 the query output vehicle ID list $V_{LIST}$ is returned.

The procedure simply lists the vehicles residing in any of the grid cells (on any of the three layers) that contains the vehicle given as input to the procedure. If a proximity beyond a grid cell is needed around a vehicle (e.g., due to its high speed, the braking distance and thus the impact area of the vehicle is increased), additional adjacent grid cells may also be checked for other vehicles.

In the following, the multi-vehicle motion analyzer 510 will be explained in more detail.

The role of the multi-vehicle motion analyzer 510 is to interpret the location, motion, maneuver and trajectory of two or more vehicles in the context of each other as well as in the context of the road map that describes the environment and the road rules that are in effect at the area and apply to the situation of the vehicles. Additional information such as time of day, visibility, weather conditions (temperature, humidity, precipitation, road surface conditions such as material of the road surface, slipperiness of the road, smoothness of the road surface), vehicle model, braking distance, etc. may also be taken into account by the analysis (e.g., to identify that an observed maneuver or maintained following distance between vehicles is not in line with the weather conditions). These may be available from external sources, such as public weather reports and vehicle registration databases, as well as from additional vehicular sensors such as light, humidity, rain, etc. sensors that may be present on-board the vehicle. Also the slippery may be analyzed by a sensor or a vehicle having appropriate means for that purpose, wherein such information can be provided to the influencing factors database 570. Slippery of the road may considerably vary e.g. at locations where roads may become frozen and/or covered by snow at temperatures around zero degrees or below. Heavy rain can also increase slippery of the road surface. Braking distance may depend on, not only of the speed of the vehicle, but also vehicle properties such as efficiency of brakes, weight of the vehicle, properties of tires of the vehicle, etc. Such vehicle dependent braking properties can also be called as vehicle conditions related to breaking efficiency. In accordance with an embodiment, the vehicle location and motion database 580 may obtain such information of the vehicles from the vehicles, or a part of the vehicle dependent information may be obtained from a manufacturer of the vehicle on the basis of a model and/or type of the vehicle. In accordance with an embodiment, the breaking distance may be calculated by using the vehicle properties, speed, acceleration and/or some other vehicle and/or maneuver dependent information.

Information from additional vehicular sensors may be collected along with the location and motion sensor data. The multi-vehicle motion analyzer 510 builds on the vehicle location and motion database 580 to efficiently query information about individual vehicles as well as to lookup the vehicles residing in the proximity of another vehicle. The efficiency of the database is a key for the scalability of the analytics carried out by the multi-vehicle motion analyzer 510.

Figure 14A:
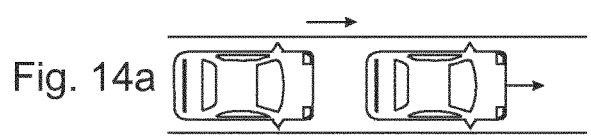
FIG. 14 shows an example of a maneuver of vehicle taking over a front vehicle.
Figure 14B:
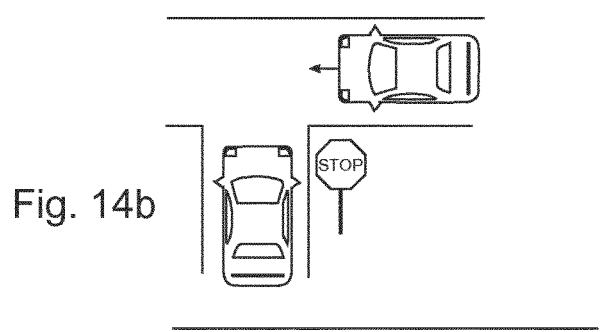
Figure 14C:
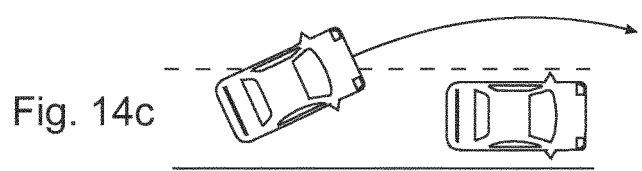

The analytics builds on the concept of the right of way (or priority) between vehicles; it means that in a given traffic situation, if two vehicles get in the proximity of each other or one vehicle is making a brake, course change or other maneuver due to the presence and behaviour of another car, there are road rules that state which vehicle should have yielded to the other and which one should have adjusted its trajectory and motion to the other one. In a case a vehicle has priority over another (e.g., it is moving forward in front of the other car, has the right of way in a junction, or has already engaged in a maneuver of taking over the front vehicle, as illustrated in FIG. 14), the priority one should ideally be free to choose its maneuvers (within the boundaries of the road rules) and the other one should be adjusting its own maneuvers not to hold up or pressure the priority one. Therefore, it is generally not a problem if a priority vehicle made the other one to slow down, stop or delay its maneuver as long as it is not obviously jeopardizing the non-priority one (e.g., no unexpected sudden motion or violation of rules). It is also not a problem if vehicles routinely adjust their speed as they align their motion with the flow of traffic or voluntarily give way to others (e.g., let a vehicle change a lane by slowing down to open up a slot in the lane). In these maneuvers, vehicles are not supposed to come into dangerous proximity within each other (especially at high speeds) and the order of the maneuvers is so that whoever is making a considerate voluntary move does it first and then the benefitted vehicle makes its move as a response.

Some examples of problematic maneuvers are those where a vehicle having priority is forced to change its course or execute an evasive maneuver as a response to the presence or motion of a non-priority one. One focus of the multi-vehicle motion analyzer 510 is to detect such problematic maneuvers automatically.

Figure 15:
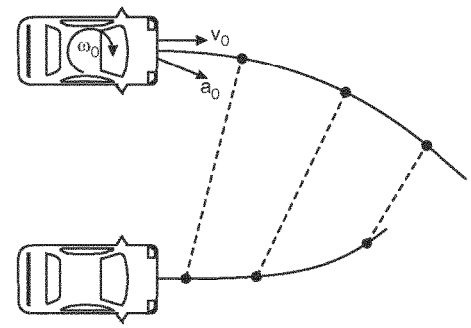
FIG. 15 illustrates an example of a concept of simulation driven analytics, in accordance with an embodiment.

In one embodiment, to detect such problematic maneuvers is to conduct "what-if" simulations that generate a trajectory for a selected vehicle based on its observed motion up to the start of the simulation, projecting a continuity of its previous motion during the simulation time. The projected trajectory of the simulated vehicle can be compared with the observed trajectory of another vehicle to evaluate what would have happened if the simulated vehicle simply continued its course without performing additional maneuvers. The trajectory simulation should consider the kinematic parameters of the simulated vehicle at the start of the simulation (e.g., its initial location, velocity, acceleration, rotation), the road map, the road rules, as well as the driving habits of the simulated vehicle based on a longer period of observed behaviour prior to the simulated interval to emulate how the driver would have behaved (e.g., how the driver takes turns in case the road has a curve that needs to be followed or with what intensity the driver normally brakes). The simulation should only cover a relatively short time interval, preferably one that corresponds to a relaxed comfortable response time for a human driver (e.g., between 2-5 seconds). The motivation of the simulation is to see what would or could have happened if the driver did not take immediate abrupt actions; however, as any driver is expected to stay alert and be able to adjust its driving within a relaxed time interval in effect to any traffic situation, being impacted by other drivers is only a problem if it happens within a too short time and it is unexpected (violates road rules and right of way). If the simulation reveals that the two vehicles would have come in close contact (or in extreme cases potentially even crash) without the priority vehicle taking action (i.e., its simulated "what-if" trajectory significantly differs from its real observed trajectory and approaches/intersects the observed trajectory of the other vehicle), the conclusion is that the priority vehicle was forced by the other vehicle. Note that in order to gauge the uncertainty in the projected behaviour, an ensemble approach can be followed where multiple simulations are run with slightly arbitrated starting points and assumptions and the superposition of the outcomes is considered in the evaluation. The concept of simulation driven analytics is illustrated in FIG. 15.

The above mentioned relatively short time interval may be a predetermined time interval, such as a few seconds, or may depend on a situation, e.g. the amount of neighbouring vehicles, speed limit at the location in question, traffic density, etc.

The term selected vehicle means in this context a vehicle whose trajectory and vehicles neighbouring the selected vehicle will be examined to find out if the neighbouring vehicle(s) has/have affected the traverse of the selected vehicle and/or if the selected vehicle has affected the traverse of the neighbouring vehicle(s). The selected vehicle may also be called a target vehicle.

Scenarios found to be dangerous by the multi-vehicle motion analyzer 510 may be collected and reported to authorities (e.g., police). Each report may contain a recording of the observed location and motion tracks of the participating vehicles (ground truth), the identified roles of vehicles (victim, aggressor, bystander, etc.) as well as the one or more simulated trajectories that provide the reason behind assigning such roles to vehicles. Statistics may be collected for each vehicle to evaluate how frequently it jeopardizes other vehicles and to establish a general driver safety score. Authorities can process the records further to decide about potential actions and generate supportive evidence that is presentable as the basis of law/rule enforcement. The automatic detection of dangerous scenarios can also be utilized by a range of appliances within the vehicles (e.g., Advanced Driver Assistance Systems (ADAS) alerting the violating driver of its own hazardous behaviour or a warning distributed to other drivers in the proximity to look out for a non-cooperative driver) or outside the vehicles (e.g., systems collecting statistics of driving habits). This requires that the Multi-vehicle Motion Analytics Part is interfacing with such components that may disseminate information into such vehicular communication systems.

In accordance with an embodiment the projection a continuity of the trajectory simulation is performed as follows. At least some detected locations of a part of the observed trajectory are used to determine when there was an unexpected change (due to a disturbance by some external factor) in the motion of the vehicle. Information of the road and road rules such as speed limits, priorities of vehicles may also be taken into consideration so that motions of the vehicle (turns, accelerations, brakings etc.) which are made to follow the road line and road rules can be distinguished from other motions of the vehicle. When an assumed time of disturbance is figured out, some parameters of the motion of the vehicle at that particular time may be used and the simulated trajectory can be obtained by extrapolating the trajectory from that particular moment of time. Those parameters may include acceleration, speed and/or angular velocity of the vehicle, for example.

The particular moment of time can be selected by selecting (or viewing) such moments of time that are associated with any non-continuous changes in the movement (position) of the vehicle, where the changes can be selected, for example, from the following list: stopping, breaking, accelerating or changing the direction of the vehicle. There can be predefined thresholds the exceeding of which trigger the indication of the particular moment of time when the threshold is exceeded e.g. in the change of the velocity or the direction of the vehicle. A road profile, road rules and/or influencing factors may be taken into consideration in the determination of the particular time. For example, when there is a curve or a cross-road, changing the direction of movement may not be such a phenomenon which triggers the examination of trajectories of vehicles.

Figure 16:
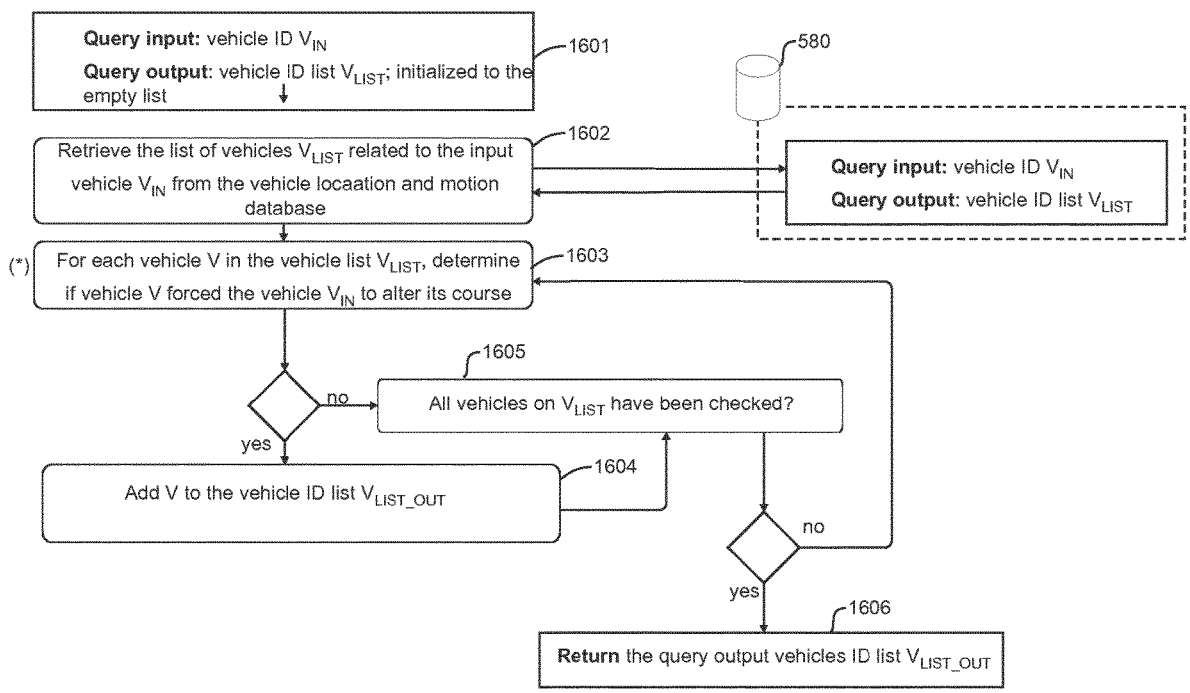
FIG. 16 outlines an example of a procedure of the multi-vehicle motion analyzer, in accordance with an embodiment.

An example of a procedure of the multi-vehicle motion analyzer 510 is outlined in FIG. 16 as a flow chart.

Step 1601 illustrates that an input for the query i.e. Query input is an identifier of the vehicle: vehicle ID $V_{IN}$. For the query, a vehicle identifier list $V_{LIST}$ (vehicle ID list) is initialized to an empty list.

In step 1602 the vehicle identifier list $V_{LIST}$ related to the input vehicle $V_{IN}$ is retrieved from the vehicle location and motion database 580.

In step 1603, for each vehicle in the vehicle list $V_{LIST}$, it is determined if a vehicle V forced the vehicle $V_{IN}$ to alter its course.

In step 1604, if such a vehicle V has been found, the vehicle V is added to the query output list $V_{LIST\_OUT}$.

In step 1605 it is examined if all vehicles in the vehicle list $V_{LIST}$ has been examined and if so, the query list $V_{LIST}$ is returned in step 1606.

If it was determined in step 1605 that not all vehicles in the vehicle list $V_{LIST}$ has been examined, the procedure returns back to the step 1603.

The procedure may be triggered periodically to perform regular checks on vehicles or can be triggered when certain actions are detected within the location/motion data and road context of an individual vehicle (e.g., if a vehicle performed a brake on a straight road, the implementation may check whether it was forced by some other vehicle). The scope of the procedure is to analyse whether a specific vehicle (denoted by $V_{IN}$ in the flow chart) has been forced to take actions by other vehicles. If such vehicles are found, the procedure returns a list of their identities; otherwise, and empty list is returned. The procedure benefits from the efficient vehicle proximity information provided by the vehicle location and motion database 580, i.e., only those vehicles are considered potentially impactful vehicles (and become subject of "what-if" simulations) that are physically close to the specific vehicle that is the subject of the study. This approach ensures scalability of the implementation as it limits the number of simulations that need to be conducted. The step 1603 marked by (*) in FIG. 16 is detailed further in FIG. 17.

Figure 17:
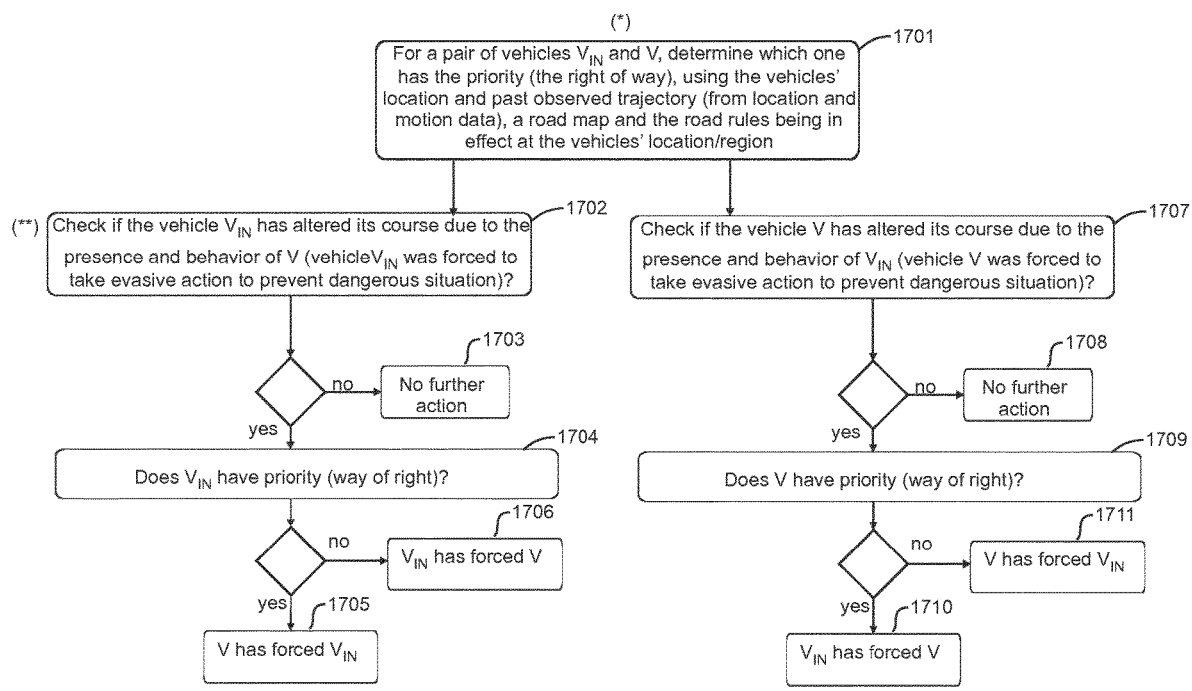
FIG. 17 provides further details of the example of FIG. 16, in accordance with an embodiment.

In FIG. 17 further details are given about the step marked by (*) in FIG. 16 i.e., to detect the act of forcing a vehicle. The flow chart describes the procedure to detect if a vehicle forced another vehicle to take action in a problematic way, i.e., considering which vehicle had the right of way in the given traffic situation.

In step 1701, for a pair of vehicles $V_{IN}$ and V, it is determined which one has the priority (the right of way), using the vehicles' location and past observed trajectory (from location and motion data), a road map and the road rules being in effect at the vehicles' location/region.

In step 1702 it is checked if the vehicle $V_{IN}$ has altered its course due to the presence and behavior of V. In other words, whether vehicle $V_{IN}$ was forced to take evasive action to prevent dangerous situation or not.

If it was determined in step 1702 that the vehicle $V_{IN}$ has not altered its course due to the presence of other vehicles, no further actions will be taken (Step 1703).

On the other hand, if it was determined in step 1702 that the vehicle $V_{IN}$ has altered its course due to the presence of some other vehicle, it is determined in step 1704, if the vehicle $V_{IN}$ have priority (way of right) over the vehicle V. If so, the process concludes that the vehicle V has forced the vehicle $V_{IN}$. Otherwise, the process concludes that the vehicle $V_{IN}$ has forced the vehicle V.

In step 1605 it is examined if all vehicles in the vehicle list $V_{LIST}$ has been examined and if so, the query list $V_{LIST}$ is returned in step 1606.

If it was determined in step 1605 that not all vehicles in the vehicle list $V_{LIST}$ has been examined, the procedure returns back to the step 1603.

In the right hand side of the flow diagram of FIG. 17 an opposite examination is illustrated i.e. examining whether the vehicle $V_{IN}$ has forced some other vehicle V to alter its course.

In step 1707 it is checked if the vehicle V has altered its course due to the presence and behavior of $V_{IN}$. In other words, whether vehicle V was forced to take evasive action to prevent dangerous situation or not.

If it was determined in step 1707 that the vehicle $V_{IN}$ has not altered its course due to the presence of other vehicles, no further actions will be taken (Step 1708).

On the other hand, if it was determined in step 1708 that some other vehicle V has altered its course due to the presence of vehicle $V_{IN}$, it is determined in step 1709, if the vehicle V have priority (way of right) over the vehicle $V_{IN}$. If so, the process concludes that the vehicle $V_{IN}$ has forced the vehicle V. Otherwise, the process concludes that the vehicle V has forced the vehicle $V_{IN}$.

It should be noted that the priority vehicle may have also forced the non-priority vehicle to take action but this is not considered problematic (due to the right of way) as long as the priority vehicle is not violating the road rules. The problematic discovery is if the non-priority vehicle forces the priority one to take action. Still, it is worth noting if a non-priority driver was forced to perform an abrupt maneuver to give the right of way to others as it is either an indication of the careless behaviour of the non-priority driver or the situation is encoded into the poorly designed road structure and surrounding architecture (e.g., when a driver is not able to see into a junction where it has to give way to others). Depending on which is the cause, the insight can be channelized into different actions (towards the driver, or towards the road authority to improve road conditions). The step marked by () in FIG. 17 is further detailed in FIG. 18**.

Figure 18:
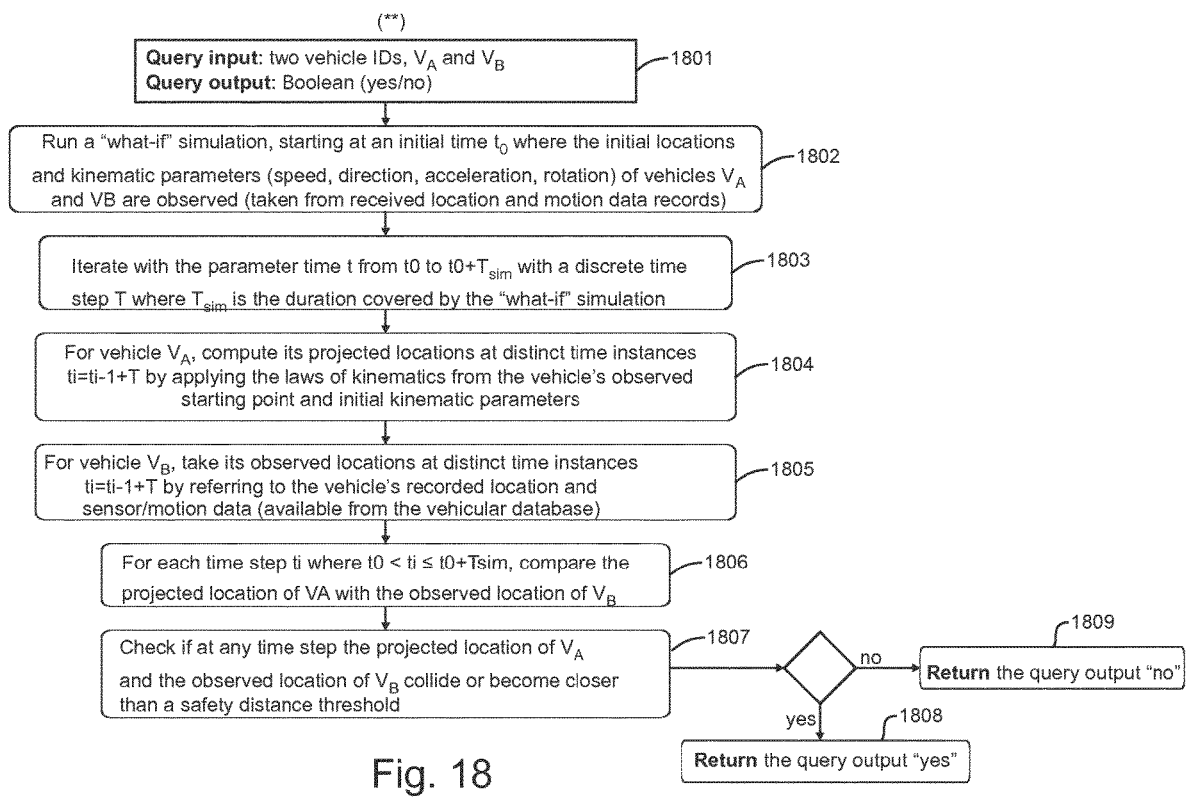
FIG. 18 provides further details of the example of FIG. 17, in accordance with an embodiment.

In FIG. 18 further details are given about the step marked by () in FIG. 17**. The flow chart describes a "what-if" simulation performed to detect in the context of two vehicles, denoted by $V_A$ and $V_B$, if $V_A$ was forced to take action (alter its course, execute maneuver, etc.) due to $V_B$.

In step 1801 a query input is received with two vehicle identifiers $V_A$ and $V_B$.

In step 1802 a "what-if" simulation is run, starting at an initial time to where the initial locations and kinematic parameters (e.g speed, direction, acceleration, rotation) of vehicles $V_A$ and $V_B$ are observed. These parameters can be taken from received location and motion data records.

In step 1803 an iteration is performed with the parameter time t from $t_0$ to $t_0+T_{sim}$ with a discrete time step T where $T_{sim}$ is the duration covered by the "what-if" simulation.

In step 1804, for vehicle $V_A$, its projected locations are computed at distinct time instances $t_i=t_{i-1}+T$ by applying the laws of kinematics from the vehicle's observed starting point and initial kinematic parameters.

In step 1805, for vehicle $V_B$, its observed locations are taken at distinct time instances $t_i=t_{i-1}+T$ by referring to the vehicle's recorded location and sensor/motion data, which are available from the vehicular database 581.

In step 1806 the projected location of the vehicle $V_A$ is compared with the observed location of the vehicle $V_B$ for each time step $t_i$ where $t_0 < t_i \leq t_0+T_{sim}$.

In step 1807 it is checked if at any time step the projected location of the vehicle $V_A$ and the observed location of vehicle $V_B$ collide or become closer than a safety distance threshold.

If it was observed in step 1807 that the projected location of the vehicle $V_A$ and the observed location of vehicle $V_B$ collide or become closer than a safety distance threshold a query output indicative of a positive result (e.g. "yes") is returned in step 1808.

If it was observed in step 1807 that the projected location of the vehicle $V_A$ and the observed location of vehicle $V_B$ does not collide or become closer than a safety distance threshold a query output indicative of a negative result (e.g. "no") is returned in step 1809.

It should be noted that the relation of a vehicle forcing another vehicle to take action can be transitive. That is, if a vehicle $V_B$ forces vehicle $V_A$ to take action, but at the same time vehicle $V_C$ forces $V_B$ to take action, then it is also true that $V_C$ forces $V_A$ to take action and $V_B$ may not be responsible for forcing $V_A$. The transitivity should be taken into account when responsibility for forcing another vehicle is considered.

In the following, some examples of additional use cases are shortly presented.

The apparatus, method and system is an enabler of a wide range of use cases that depend on the capability of automatic multi-vehicle motion and impact analytics. Such use cases include but are not limited to the following prominent examples:

One application of the invention is to detect those situations when, fortunately, no accident has happened, but it would have or could have happened if it was not for the proactive action of a driver. However, in those cases when an accident has already happened, the scenario also helps automatically and objectively reconstruct and identify the causes leading to it.

Discovering notoriously dangerous road and environment architecture is possible by creating statistics of the locations where drivers are often forced by others, especially if the forced ones are the non-priority drivers (such as when a driver is not able to see the traffic to which it is supposed to yield). In those cases, the information could be channelized to the road authority to improve the road architecture (e.g., install a mirror in the street corner, change the direction of one-way roads, prohibit parking on a problematic side, trim vegetation, etc.).

Risk assessment of individual drivers: even if someone is not causing accidents directly, careless driving can create dangerous situations that put other drivers under stress up to the point where they become the cause of a real accident or near-accident. In such cases the transitivity of forcing others should be considered to identify the real aggressor.

Discovery of road anomalies (stationary vehicle, logs/rocks or other blocking objects, accident scene, etc.) that divert traffic from its usual route. Estimate the impact area of the diversion (single lane, multiple lanes in one direction, lanes in multiple directions, etc.). Analyzing if the incident is on a busy road or in a low traffic area helps decide whether emergency traffic policing/diversion is necessary by the authorities or the drivers route around the impact area without a problem.

"What-if" analysis of changing the local road rules or traffic organization (e.g., opening a bus lane) in terms of changes in traffic, formation of congestion, etc.

In the following, an example of a use case of utilizing the data for analyses will be described in more detail with reference to a user equipment of FIG. 19b. An authority, for example a police office, can enter a vehicle identifier by a user equipment 2200 of a vehicle whose recent trajectory is to be analyzed. This may be performed, for example, in a situation in which an accident has occurred to find out who would be liable for the accident. The user equipment transmits by a communication element 2203 a query to a server 2201 in which the query is examined and the multi-vehicle motion analyzer 510 examines the vehicle location and motion database 580 to find out the grid cell of each grid layer where the vehicle is listed i.e. that grid cell in each layer which covers the geographical location where the vehicle is located. When the grid cells are identified, the multi-vehicle motion analyzer 510 examines the lists to find out which other vehicles may have been present near the vehicle in question. In other words, the multi-vehicle motion analyzer 510 determines that all the vehicles whose vehicle identifiers exist in the lists are potential causes of the accident or another unforeseen event. The multi-vehicle motion analyzer 510 can then simulate how the vehicle might have moved without the unforeseen event and compare the simulated trajectory to real trajectories of the nearby vehicles. The result of the comparison may reveal what caused the unforeseen event. The multi-vehicle motion analyzer 510 sends the results to the user equipment 2200 where the result can be presented to the user of the user equipment 2200 by a user interface 2204 (UI).

In accordance with an embodiment, some of the operations above may be performed in the user equipment 2200 as well. For example, the multi-vehicle motion analyzer 510 only searches the vehicle location and motion database 580 to find out motion data of the vehicle and other nearby vehicles and send the motion data to the user equipment 2200, wherein the user equipment 2200 performs the simulation and other analyses instead of the multi-vehicle motion analyzer 510.

In accordance with an embodiment, the user equipment 2200 has a positioning receiver 2209 or some other kind of element for determining the location where the user equipment is located. Hence, the user equipment may use that location in a query to the multi-vehicle motion analyzer 510 to obtain information of vehicles located nearby and therefore find out trajectories travelled by those vehicles. The user equipment 2200 may analyze whether some of the vehicles has disturbed/affected trajectories of some other vehicle or vehicles or whether some of the vehicles have broken the road rules, for example.

Figure 19A:
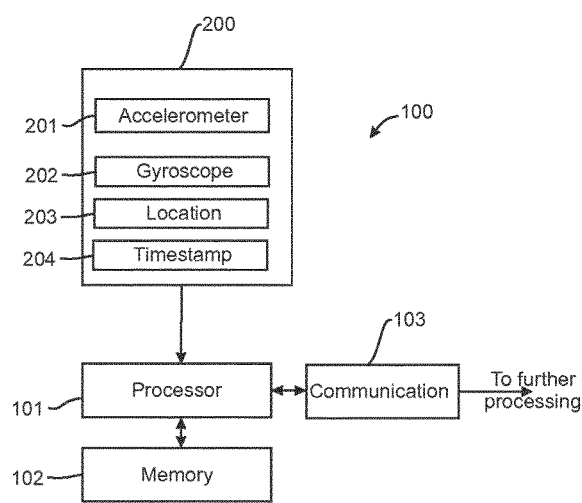
FIG. 19a depicts an example of an apparatus providing sensor data from a vehicle, in accordance with an embodiment.
Figure 19B:
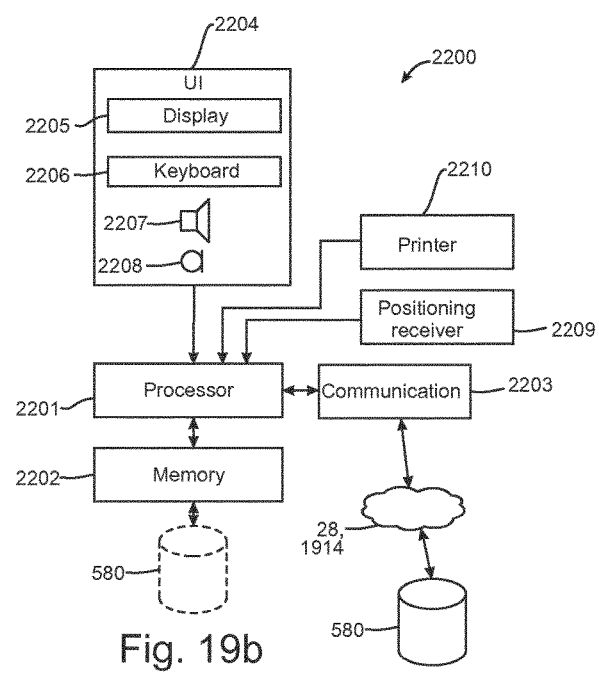
FIG. 19b depicts an example of a user equipment, in accordance with an embodiment.

In accordance with the embodiment illustrated in FIG. 19b, the user equipment 2200 also has a memory 2202 for storing computer code, parameters, data, etc. The user interface 2204 comprises a display 2205, a keyboard or some other user command and data input element 2206, a loudspeaker 2207 and a microphone 2208. The user equipment 2200 may also comprise a printer 2210 and/or some other equipment for printing e.g. a list of vehicles, trajectories of vehicles etc.

In accordance with an embodiment, the vehicle location and motion database 580 or parts of it can be stored to the memory 2202 of the user equipment.

In accordance with an embodiment, the user equipment 2200 receives a vehicle identifier of a selected vehicle, for example entered by a user of the user equipment 2200. The user equipment 2200 exchanges information with the vehicle location and motion database 580 by sending the vehicle identifier to the multi-vehicle motion analyzer 510. The multi-vehicle motion analyzer 510 searches from the vehicle location and motion database 580 motion data of the selected vehicle and other nearby vehicles and send the motion data to the user equipment 2200. The multi-vehicle motion analyzer 510 searches from the grid location database 582 at least a first grid cell from the first grid layer, a second grid cell of the second grid layer and a third grid cell of the third grid layer with which the vehicle identifier has been associated. If such data has been found the multi-vehicle motion analyzer 510 obtains from the grid location database 582 an identifier of at least one other vehicle associated with the first grid cell, the second grid cell and the third grid cell. The multi-vehicle motion analyzer 510 also obtains from the vehicle location and motion database 580 indications of movements of the selected vehicle and the other vehicles by using the vehicle identifier and the identifiers of other vehicles; and examines on the basis of the indications of movements whether any of the other vehicles have affected a trajectory of the selected vehicle, or vice versa. The result of the examination can be transmitted to the user equipment 2200 and displayed to the user of the user equipment 2200.

FIG. 19a depicts an example of an apparatus 100 for a vehicle 300, which may be, for example, a separate device or a part of another device, such as a smart phone or another kind of a mobile phone, a tablet computer, a laptop computer, a navigator, etc. The apparatus 100 comprises motion sensors 200 such as an accelerometer 202 (non-linear or linear accelerometer) and a gyroscope 204. The accelerometer 202 outputs three-dimensional acceleration data i.e. one acceleration data component for each of the coordinate directions of the sensor coordinate system. Correspondingly, the gyroscope 204 outputs three-dimensional rotation data i.e. one rotation data component for each of the coordinate directions of the sensor coordinate system. It is assumed here that both the accelerometer 202 and the gyroscope 204 are installed so that they have the same sensor coordinate system.

Data from the motion sensors 200 may be analogue, digital, pulse width modulated or in some other appropriate form, but in this specification it is assumed that the data provided to the processor 101 is in digital form i.e. output as digital samples. Therefore, the motion sensors 200 take care of possible conversions from the format provided by the sensor to the digital format.

Outputs of the motion sensors 200 are coupled to the processor 101 which receives the data and may perform the operations described above in this specification. The apparatus 100 also comprises at least one memory 102 for storing sensor data, parameters, rotation matrix, computer code to be executed by the processor 101 for different operations, etc.

The apparatus 100 of FIG. 19a also comprises a communication element 103 for providing the vehicle motion, location, timing and identity information to the multi-vehicle motion analyzer 510.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 20:
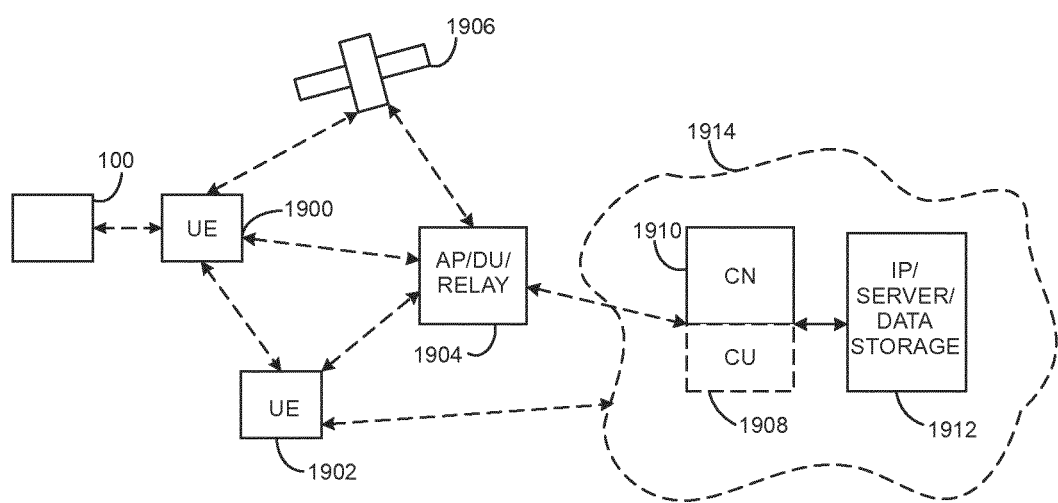
FIG. 20 shows a part of an exemplifying radio access network.

FIG. 20 depicts examples of simplified system architectures only showing some elements and functional entities, all being logical units, whose implementation may differ from what is shown. The connections shown in FIG. 20 are logical connections; the actual physical connections may be different. It is apparent to a person skilled in the art that the system typically comprises also other functions and structures than those shown in FIG. 20.

The embodiments are not, however, restricted to the system given as an example but a person skilled in the art may apply the solution to other communication systems provided with necessary properties.

The example of FIG. 20 shows a part of an exemplifying radio access network.

FIG. 20 shows user devices 1900 and 1902 configured to be in a wireless connection on one or more communication channels in a cell with an access node (such as (e/g)NodeB) 1904 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The device 1900, 1902 may correspond with the user equipment depicted in FIG. 19b, for example.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 1910 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 20) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 1912, or utilise services provided by them. The communication network may also be able to support the usage of cloud services, for example at least part of core network operations may be carried out as a cloud service (this is depicted in FIG. 20 by "cloud" 1914). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 1904) and non-real time functions being carried out in a centralized manner (in a centralized unit, CU 1908).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 1906 in the mega-constellation may cover several satellite-enabled network entities that create on-ground cells. The on-ground cells may be created through an on-ground relay node 1904 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 20 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 20). A HNB Gateway (HNB-GW), which is typically installed within an operator's network may aggregate traffic from a large number of HNBs back to a core network.

In accordance with an embodiment, the vehicle location and motion database 580 may be implemented in the internet 1912, wherein apparatuses 100 of the vehicles 300 and user equipments 2200 may communicate with the vehicle location and motion database 580 via the internet 1912.

Figure 21:
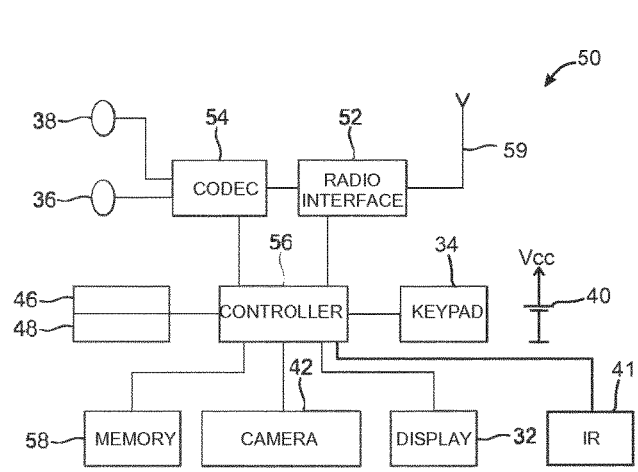
FIG. 21 shows a block diagram of an apparatus according to an example embodiment.
Figure 22:
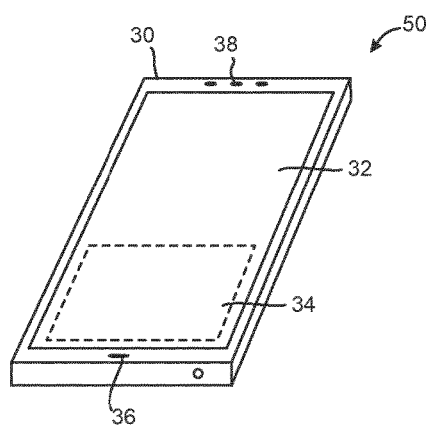
FIG. 22 shows an apparatus according to an example embodiment.

The following describes in further detail suitable apparatus and possible mechanisms for implementing some embodiments. In this regard reference is first made to FIG. 21 which shows a schematic block diagram of an exemplary apparatus or electronic device 50 depicted in FIG. 22, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 23:
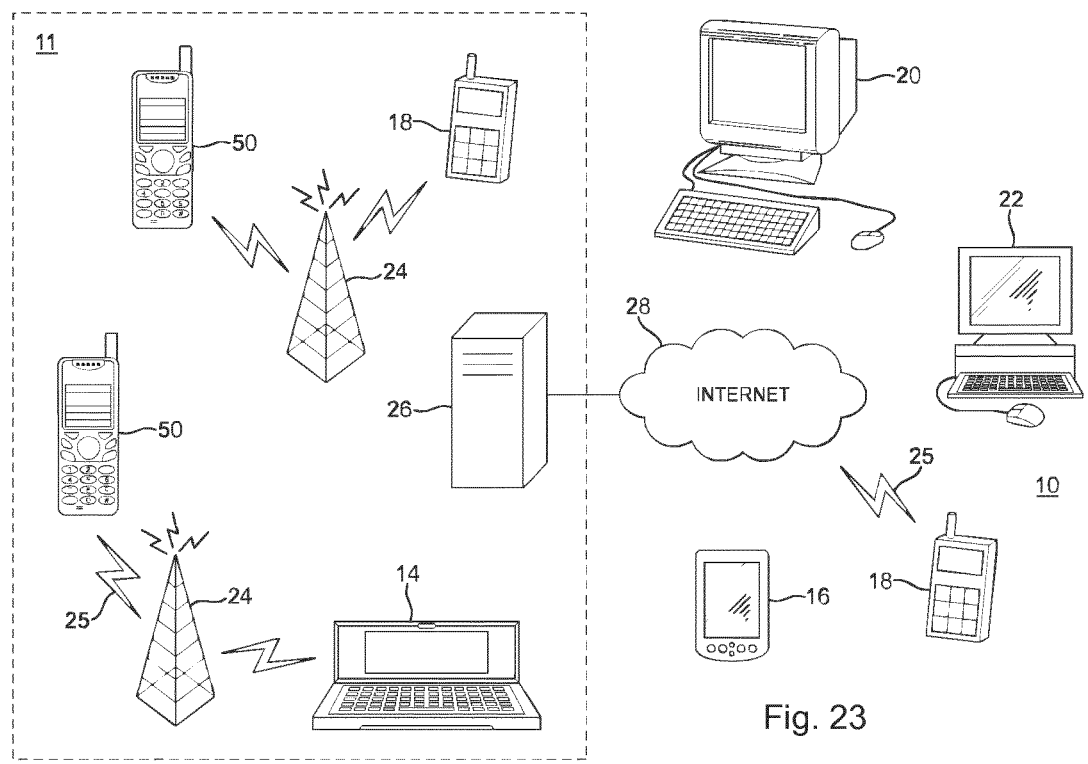
FIG. 23 shows an example of an arrangement for wireless communication comprising a plurality of apparatuses, networks and network elements.
Figure 24:
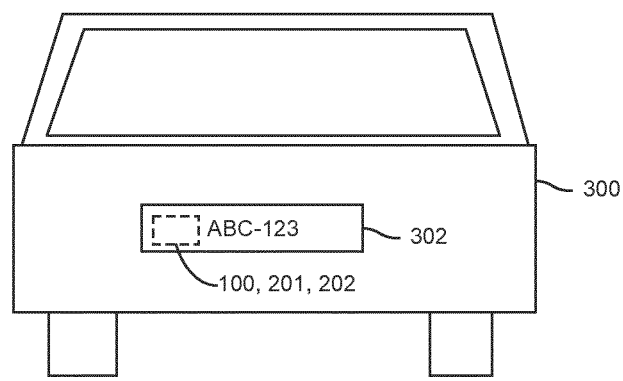
FIG. 24 illustrates an example of motion sensors attached with a register plate.

With respect to FIG. 23, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 23 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Although the above examples describe embodiments of the invention operating within a wireless communication device, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus, comprising:
   at least one processor; and
   at least one memory including computer program code,
   the at least one memory and the computer program code being configured to, with the at least one processor, cause the apparatus at least to:
   receive sensor data from at least one motion sensor associated with a selected vehicle from a plurality of vehicles, said sensor data indicating movements of the vehicle in a geographical area;
   obtain from the sensor data location of the vehicle in the geographical area;
   maintain a vehicle location and motion database comprising at least three grid layers of rectangular grid cells representing at least a part of the geographical area, said grid cells of the at least three grid layers being partly overlapping so that borders of the grid cells of different grid layers have an offset between each other in both longitudinal and latitudinal directions;
   map the location of the vehicle to a grid cell of each grid layer into which the location of the vehicle belongs;
   insert or maintain an identifier of the vehicle in a list of vehicle identifiers for the mapped grid cell of each grid layer; and
   determine, on the basis of the identifiers of the vehicles in the lists, which other vehicles are in a proximity of said selected vehicle.

2. The apparatus according to claim 1, wherein the at least one memory and the computer program code are further configured to, with the at least one processor, cause the apparatus to:
   maintain a vehicle location and motion database; and
   store the indication of movements of the vehicle to the vehicle location and motion database.

3. The apparatus according to claim 2, wherein the at least one memory and the computer program code are further configured to, with the at least one processor, cause the apparatus to:
   retrieve from the list of vehicle identifiers of each grid layer where the selected vehicle has been mapped, identifiers of other vehicles located within the geographical area covered by the mapped grid cell of any of the at least three grid layers; and
   retrieve from the vehicle location and motion database indication of movements of the vehicle and the other vehicles to examine at least one of:
   whether any of the other vehicles have affected a trajectory of the vehicle;
   whether the vehicle has affected a trajectory of any of the other vehicles.

4. The apparatus according to claim 3, wherein the at least one memory and the computer program code are further configured to, with the at least one processor, cause the apparatus to:
   retrieve from the vehicle motion database previous location and motion data of the vehicle which have occurred before a particular moment of time;

retrieve from the vehicle motion database previous location and motion data of the other vehicle which could have affected the trajectory of the vehicle;
use the previous location and motion data of the vehicle to simulate a trajectory of the vehicle which would have occurred after the particular moment of time to obtain a simulated trajectory of the vehicle; and
compare the simulated trajectory of the vehicle to the trajectory of the other vehicle to determine whether the simulated trajectory and the trajectory of the other vehicle collided.

5. The apparatus according to claim 4, wherein the at least one memory and the computer program code are further configured to, with the at least one processor, cause the apparatus to:
select said particular moment of time to be a moment of time when a trajectory of either said selected vehicle could have affected by another vehicle or another vehicle could have affected by said selected vehicle; and
retrieve from the vehicle motion database previous location and motion data of the vehicle covering a predetermined time interval around said particular moment of time.

6. The apparatus according to claim 4, wherein the at least one memory and the computer program code are further configured to, with the at least one processor, cause the apparatus to:
use one or more of a road data, road rules data and influencing factors data in the simulation to find out such a simulated trajectory of the vehicle which fulfils said one or more of the road data, road rules and influencing factors.

7. The apparatus according to claim 5, wherein
the road data includes data of trajectories of vehicles previously travelled in that geographical location;
the road rules data at least includes data of road geometry, road lines, direction of travel of the road lines; and wherein
the influencing factors include data related to at least one of weather, road quality, visibility conditions, material of the road surface, slipperiness of the road, smoothness of the road surface, and braking efficiency of the vehicle.

8. The apparatus according to claim 4, wherein the at least one memory and the computer program code are further configured to, with the at least one processor, cause the apparatus to perform:
using the previous location and motion data of the vehicle to determine the trajectory, acceleration, speed and angular velocity of the vehicle;
obtaining the simulated trajectory by extrapolating the trajectory from said particular moment of time by using the determined acceleration, speed and angular velocity.

9. The apparatus according to claim 2, further comprising the vehicle location and motion database.

10. The apparatus according to claim 1, wherein the at least one memory and the computer program code are further configured to, with the at least one processor, cause the apparatus to perform:
examining any of the lists of vehicle identifiers to determine if the list comprises identical vehicle identifiers; and
leaving in the list only one occurrence of the identical identifiers.

11. The apparatus according to claim 10, wherein the at least one memory and the computer program code are further configured to, with the at least one processor, cause the apparatus to perform:
constructing a list of vehicle identifiers from the list of identifiers of vehicles of the mapped grid cell of each grid layer so that the list of vehicle identifiers contains no more than one occurrence of each identifier of a vehicle.

12. The apparatus according to claim 1, wherein the at least one memory and the computer program code are further configured to, with the at least one processor, cause the apparatus to perform:
maintaining a vehicle location and motion database having N grid layers, where N≥3, wherein grid cells of the N grid layers overlap in both a latitudinal and longitudinal direction.

13. The apparatus according to claim 1, wherein the sensor data comprises at least location data from a location sensor, acceleration data from an accelerometer, rotation data from a gyroscope, time data indicative of the moment of time the sensor data has been captured and the identifier of the vehicle.

14. A method, comprising:
receiving sensor data from at least one motion sensor associated with a selected vehicle from a plurality of vehicles, said sensor data indicating movements of the vehicle in a geographical area;
obtaining from the sensor data location of the vehicle in the geographical area;
maintaining a vehicle location and motion database comprising at least three grid layers of rectangular grid cells representing at least a part of the geographical area, said grid cells of the at least three grid layers being partly overlapping so that borders of the grid cells of different grid layers have an offset between each other in both longitudinal and latitudinal directions;
wherein the method further comprises:
mapping the location of the vehicle to a grid cell of each grid layer into which the location of the vehicle belongs;
inserting or maintaining an identifier of the vehicle in a list of vehicle identifiers for the mapped grid cell of each grid layer; and
determining, on the basis of the identifiers of the vehicles in the lists, which other vehicles are in a proximity of said selected vehicle.

15. A computer program embodied on a non-transitory computer-readable medium, said computer program including one or more sequences of one or more instructions which, when executed by one or more processors, cause an apparatus to at least perform:
receiving sensor data from at least one motion sensor associated with a vehicle from a plurality of vehicles, said sensor data indicating movements of the vehicle in a geographical area;
obtaining from the sensor data location of the vehicle in the geographical area;
maintaining a vehicle location and motion database comprising at least three layers of rectangular grid cells representing at least a part of the geographical area, said grid cells of the at least three grid layers being partly overlapping so that borders of the grid cells of different grid layers have an offset between each other in both longitudinal and latitudinal directions;

mapping the location of the vehicle to a grid cell of each grid layer into which the location of the vehicle belongs;

inserting or maintaining an identifier of the vehicle in a list of vehicle identifiers for the mapped grid cell of each grid layer; and determining on the basis of the identifiers of the vehicles in the lists which other vehicles are in a proximity of said selected vehicle.

16. A user equipment, comprising:

at least one processor; and at least one memory including computer program code, the at least one memory and the computer program code being configured to, with the at least one processor, cause the user equipment at least to:

exchange information with a vehicle location and motion database and a grid location database, wherein the vehicle location and motion database and said grid location database comprise at least three grid layers of rectangular grid cells representing at least a part of the geographical area and a list of vehicle identifiers for each of said at least three grid layers, said grid cells of the at least three grid layers being partly overlapping so that borders of grid cells of different grid layers have an offset between each other in both longitudinal and latitudinal directions, and said vehicle location and motion database having information of movements of vehicles located in the geographical area;

receive a vehicle identifier of a selected vehicle;

search from the grid location database at least a grid cell from each of the at least three grid layers with which the vehicle identifier of the selected vehicle has been associated;

obtain from the list of vehicle identifiers an identifier of at least one other vehicle associated with any of the searched grid cell; and determine on the basis of the identifiers of vehicles in the lists which other vehicles are associated with any of the searched grid cell.

17. The user equipment according to claim 16, wherein the at least one memory and the computer program code are further configured to, with the at least one processor, cause the user equipment to:

obtain from the vehicle location and motion database indications of movements of the selected vehicle and the other vehicles which are in a proximity of said selected vehicle by using the vehicle identifier of the selected vehicle and the identifiers of the other vehicles; and examine on the basis of the indications of movements at least one of:

whether any of the other vehicles have affected a trajectory of the selected vehicle;

whether the selected vehicle has affected a trajectory of any of the other vehicles.

18. The user equipment according to claim 16, wherein the at least one memory and the computer program code are further configured to, with the at least one processor, cause the user equipment to:

transmit to a multi-vehicle motion analyzer at least the identifier of the selected vehicle and the identifier of the at least one other vehicle; and receive from the multi-vehicle motion analyzer an indication of at least one of:

whether any of the other vehicles have affected a trajectory of the selected vehicle;

whether the selected vehicle has affected a trajectory of any of the other vehicles.

19. A method for a user equipment, said method comprising:

exchanging information with a vehicle location and motion database and a grid location database, wherein the vehicle location and motion database and said grid location database comprise at least three grid layers of rectangular grid cells representing at least a part of the geographical area and a list of vehicle identifiers for each of said at least three grid layers, said grid cells of the at least three grid layers being partly overlapping so that borders of grid cells of different grid layers have an offset between each other in both longitudinal and latitudinal directions, and said vehicle location and motion database having information of movements of vehicles located in the geographical area;

receiving a vehicle identifier of a selected vehicle;

searching from the grid location database at least a grid cell from each of the at least three grid layers with which the vehicle identifier of the selected vehicle has been associated;

obtaining from the list of vehicle identifiers an identifier of at least one other vehicle associated with any of the searched grid cell; and determining on the basis of the identifiers of vehicles in the lists which other vehicles are associated with any of the searched grid cell.

20. The method according to claim 19, further comprising:

obtaining from the vehicle location and motion database indications of movements of the selected vehicle and the other vehicles which are in a proximity of said selected vehicle by using the vehicle identifier of the selected vehicle and the identifiers of the other vehicles; and examining on the basis of the indications of movements at least one of:

whether any of the other vehicles have affected a trajectory of the selected vehicle;

whether the selected vehicle has affected a trajectory of any of the other vehicles.

21. The method according to claim 19, further comprising:

transmitting at least the identifier of the selected vehicle and the identifier of the at least one other vehicle; and receiving an indication of at least one of:

whether any of the other vehicles have affected a trajectory of the selected vehicle;

whether the selected vehicle has affected a trajectory of any of the other vehicles.

\* \* \* \* \*